US009157336B2

(12) United States Patent
Wakahara et al.

(10) Patent No.: US 9,157,336 B2
(45) Date of Patent: Oct. 13, 2015

(54) WASTE HEAT RECOVERY STRUCTURE FOR STEEL MAKING ELECTRIC ARC FURNACES, STEEL MAKING ELECTRIC ARC FURNACE FACILITY, AND WASTE HEAT RECOVERY METHOD FOR STEEL MAKING ELECTRIC ARC FURNACES

(75) Inventors: Keiji Wakahara, Yokohama (JP); Nobuyuki Fujikura, Yokohama (JP); Masanari Yamazaki, Yokohama (JP); Masayuki Watanabe, Yokohama (JP); Yoshinori Okuyama, Yokohama (JP)

(73) Assignee: JP STEEL PLANTECH CO., Yokohama-shi (JP)

( * ) Notice: Subject to any disclaimer, the term of this patent is extended or adjusted under 35 U.S.C. 154(b) by 653 days.

(21) Appl. No.: 13/581,322
(22) PCT Filed: Apr. 19, 2011
(86) PCT No.: PCT/JP2011/059615
§ 371 (c)(1),
(2), (4) Date: Aug. 27, 2012
(87) PCT Pub. No.: WO2011/132669
PCT Pub. Date: Oct. 27, 2011

(65) Prior Publication Data
US 2012/0320941 A1    Dec. 20, 2012

(30) Foreign Application Priority Data

Apr. 20, 2010  (JP) ................................. 2010-097443
Apr. 20, 2010  (JP) ................................. 2010-097444

(51) Int. Cl.
*F27D 25/00*    (2010.01)
*F27D 17/00*    (2006.01)
(Continued)

(52) U.S. Cl.
CPC ... *F01K 3/22* (2013.01); *C21C 5/40* (2013.01); *C21C 5/5294* (2013.01); *F22B 1/183* (2013.01);
(Continued)

(58) Field of Classification Search
CPC ...... C21C 5/49; C21C 5/5211; C21C 5/5294; C21C 5/52; C21C 2100/06; F01K 3/22; F22D 19/00; F22D 17/00; F22D 17/003; F22D 17/004; F22D 17/008; F22B 1/183
USPC ......... 373/8, 9, 78, 77, 84, 71, 64, 73, 79, 80; 266/241, 44, 158, 159; 75/10.36, 75/10.58; 122/7 A
See application file for complete search history.

(56) References Cited

U.S. PATENT DOCUMENTS

| 3,395,512 A | * | 8/1968 | Finney, Jr. et al. ............ 122/7 A |
| 4,099,019 A | * | 7/1978 | Horibe et al. ....................... 373/9 |
| 4,257,579 A | * | 3/1981 | Bruhn et al. ................... 266/141 |
| 4,437,186 A | * | 3/1984 | Inai .................................. 373/9 |

FOREIGN PATENT DOCUMENTS

JP           5 340501        12/1993
(Continued)

OTHER PUBLICATIONS

International Search Report Issued Aug. 9, 2011 in PCT/JP11/59615 Filed Apr. 19, 2011.

*Primary Examiner* — Hung D Nguyen
(74) *Attorney, Agent, or Firm* — Oblon, McClelland, Maier & Neustadt, L.L.P.

(57) ABSTRACT

A waste heat recovery structure includes a first exhaust gas flow path provided to each of steel making electric arc furnaces to discharge exhaust gas thereinto; a waste heat boiler disposed on the first exhaust gas flow path to recover waste heat as saturated steam from exhaust gas; a steam accumulator configured to store steam formed by confluence of saturated steam parts, each generated by the waste heat boiler; a steam super heater configured to turn steam into superheated steam by heating; a second exhaust gas flow path configured to lead exhaust gas from the waste heat boiler to the steam super heater to use it for superheating; a third exhaust gas flow path configured to discharge exhaust gas from the waste heat boiler not through the steam super heater; and a switching device configured to switch flow paths between the second and third exhaust gas flow paths.

24 Claims, 14 Drawing Sheets

(51) Int. Cl.
*F01K 3/22* (2006.01)
*C21C 5/40* (2006.01)
*C21C 5/52* (2006.01)
*F22B 1/18* (2006.01)
*F27D 19/00* (2006.01)

(52) U.S. Cl.
CPC ............ *F27D 17/003* (2013.01); *F27D 17/004* (2013.01); *F27D 17/008* (2013.01); *F27D 19/00* (2013.01); *C21C 2100/06* (2013.01)

(56) References Cited

FOREIGN PATENT DOCUMENTS

| | | |
|---|---|---|
| JP | 8 277412 | 10/1996 |
| JP | 10 299424 | 11/1998 |
| JP | 2002 286209 | 10/2002 |
| WO | 2010 047004 | 4/2010 |

* cited by examiner

WASTE HEAT RECOVERY STRUCTURE FOR STEEL MAKING ELECTRIC ARC FURNACES, STEEL MAKING ELECTRIC ARC FURNACE FACILITY, AND WASTE HEAT RECOVERY METHOD FOR STEEL MAKING ELECTRIC ARC FURNACES

TECHNICAL FIELD

The present invention relates to a waste heat recovery structure for steel making electric arc furnaces, which recovers waste heat as saturated steam from exhaust gas discharged from the steel making electric arc furnaces and turns the steam into superheated steam by subsequent heating. The present invention further relates to a steel making electric arc furnace facility including such a waste heat recovery structure, and a waste heat recovery method for steel making electric arc furnaces.

BACKGROUND ART

A steel making electric arc furnace (which may be referred to as "electric furnace") employs an intermittent running operation performed by use of cycles, each of which includes steps as follows. At first, a source material, such as iron scrap, reduced iron (DRI), hot briquette iron (HBI) prepared by processing the DRI at a high temperature, molten iron, or cold iron (ingot iron), is charged into the furnace. Then, an electrode is inserted into the electric arc furnace and an electric power is applied to the electrode to melt the source material. Then, the electric power is stopped, and the molten steel is tapped out.

Iron scrap used as the source material is sometimes accompanied with paint and/or machine oil applied thereto, and so white smoke and/or evil smell may be generated due to unmixed synthetic resins. Further, carbon monoxide is generated due to carbon contained in iron scrap and/or DRI. In light of this, air is forcibly taken into the space between the furnace and furnace lid and/or into the secondary combustion chamber to achieve complete combustion of the exhaust gas.

Since this combustion gas has a high temperature higher than 1,200° C. and thus has a large amount of energy, attempts have been made to recovery its waste heat. For example, Patent Document 1 discloses a technique for recovering the sensible heat and/or combustion heat of exhaust gas discharged from a steel making electric arc furnace, by use of a waste heat boiler disposed in the exhaust gas pipe line of the electric furnace.

Further, recovered steam can be used for electric power generation by a steam turbine or the like. When the steam is supplied as a driving source for the steam turbine, the steam is preferably formed of superheated steam to increase the enthalpy at the inlet port of the turbine. In light of this, Patent Document 2 discloses a technique that recovers waste heat from a steel making electric arc furnace as saturated steam and then turns the steam into superheated steam.

PRIOR ART DOCUMENT

Patent Document

[Patent Document 1]
Jpn. Pat. Appln. KOKAI Publication No. 8-277412
[Patent Document 2]
Jpn. Pat. Appln. KOKAI Publication No. 2002-286209

SUMMARY OF INVENTION

However, for example, in a case where one running sequence cycle is set at 70 minutes in a steel making electric arc furnace, high temperature gas flows for about 55 minutes and cold gas/air flows for about 15 minutes. In this way, the high temperature gas and cold gas alternately flow in the furnace, and so the exhaust gas temperature undergoes a lot of fluctuations. As the exhaust gas temperature undergoes a lot of fluctuations like this, the steam generation amount becomes inconstant and so does the recovered steam amount. If the recovered steam amount is inconstant, the steam turbine supplied with the recovered steam suffers a decrease in electric power generation, thereby making it difficult for the steam turbine to conduct a steady running operation.

Further, the steam recovered by a waste heat boiler is saturated steam and so has a lower utility potential as it is. Accordingly, when the steam is supplied to a steam turbine or the like for electric power generation, the steam is preferably turned into superheated steam. In light of this, as described above, Patent Document 2 discloses a technique that recovers waste heat from a steel making electric arc furnace as saturated steam and then turns the steam into superheated steam. However, in the case of the method disclosed in Patent Document 2, it is necessary to use another heat source, such as a fossil fuel, to turn the saturated steam into the superheated steam, thereby lowering the energy economical efficiency.

An object of the present invention to provide a waste heat recovery structure for steel making electric arc furnaces, which recovers waste heat as saturated steam from exhaust gas discharged from the steel making electric arc furnaces and turns the steam into superheated steam by subsequent heating, wherein the recovery structure can efficiently recover the waste heat while inhibiting the temperature fluctuations of the exhaust gas, along with a high energy economical efficiency; and to further provide a steel making electric arc furnace facility including such a waste heat recovery structure.

Another object of the present invention to provide a waste heat recovery structure and a waste heat recovery method for steel making electric arc furnaces, which recover waste heat as saturated steam from exhaust gas discharged from the steel making electric arc furnaces and turns the steam into superheated steam by subsequent heating, wherein the recovery structure and method can efficiently recover the waste heat while minimizing the temperature fluctuations of the exhaust gas; and to further provide a steel making electric arc furnace facility including such a waste heat recovery structure.

According to a first aspect of the present invention, there is provided a waste heat recovery structure for a plurality of steel making electric arc furnaces, which recovers waste heat as saturated steam from exhaust gas discharged from the steel making electric arc furnaces and turns the saturated steam into superheated steam by subsequent heating, the structure comprising: a first exhaust gas flow path provided to each of the steel making electric arc furnaces to discharge exhaust gas thereinto; a waste heat boiler disposed on the first exhaust gas flow path and configured to recover waste heat as saturated steam from exhaust gas; a steam accumulator configured to store steam formed by confluence of saturated steam parts, each generated by the waste heat boiler; a steam super heater configured to turn steam, which has been stored in the steam accumulator, into superheated steam by heating; a second exhaust gas flow path configured to lead exhaust gas, which has been treated with waste heat recovery in the waste heat boiler, to the steam super heater to use it for superheating saturated steam and to then discharge it; a third exhaust gas flow path configured to discharge exhaust gas, which has been treated with waste heat recovery in the waste heat boiler, not through the steam super heater; and a switching device configured to switch flow paths for exhaust gas, which has been treated with waste heat recovery, between the second exhaust gas flow path and the third exhaust gas flow path.

In the waste heat recovery structure according to the first aspect described above, it is typical that the waste heat recovered from exhaust gas is sensible heat of exhaust gas or sensible heat and combustion heat of exhaust gas.

Further, in the waste heat recovery structure described above, it is possible that the first exhaust gas flow path includes an exhaust gas duct, a combustion chamber configured to burn exhaust gas, and the waste heat boiler is configured to form the exhaust gas duct and/or the combustion chamber. Further, it is preferable that the waste heat boiler is disposed in a region in which a temperature of exhaust gas at an outlet port of the waste heat boiler is 600° C. or more.

Further, it is preferable that the structure further comprises a gas thermometer disposed at an outlet port of the waste heat boiler and/or an inlet port of the steam super heater, and the switching device is operated to cause exhaust gas to flow into the second exhaust gas flow path when a temperature of exhaust gas at the outlet port of the waste heat boiler and/or a temperature of exhaust gas at the inlet port of the steam super heater are not lower than a predetermined temperature, and to cause exhaust gas to flow into the third exhaust gas flow path when the temperature of exhaust gas at the outlet port of the waste heat boiler and/or the temperature of exhaust gas at the inlet port of the steam super heater are lower than the predetermined temperature.

It is possible that the third exhaust gas flow path includes a ventilation duct configured to ventilate a space around each of the steel making electric arc furnaces and/or a space inside a steel making factory where the steel making electric arc furnaces are disposed, a connection piping line connecting the second flow path to the ventilation duct, and a ventilation collective duct to which ducts, each being the ventilation duct, are collectively connected. In this case, it is possible that the structure further comprises a dust collector configured to trap dust in exhaust gas flowing from the second exhaust gas flow path, and a cooler configured to cool exhaust gas to be sent to the dust collector. Further, it is possible that the structure further comprises a dust collector configured to trap dust in exhaust gas flowing from the second exhaust gas flow path, and exhaust gas flowing from the second exhaust gas flow path is mixed with cold gas flowing from the ventilation collective duct and is then led to the dust collector. More specifically, it is possible that the second exhaust gas flow path includes an exhaust gas duct downstream from the waste heat boiler for each, an exhaust gas collective duct to which ducts, each being the exhaust gas duct, are collectively connected, and a downstream exhaust gas duct extending from the exhaust gas collective duct and connected to the steam super heater, such that the downstream exhaust gas duct is connected to the ventilation collective duct, the ventilation collective duct is connected to an exhaust gas dust trapping duct equipped with the dust collector, and exhaust gas flowing from the downstream exhaust gas duct is mixed with cold gas flowing from the ventilation collective duct and is then led to the dust collector through the exhaust gas dust trapping duct. Further, it is possible that exhaust gas flowing from the second exhaust gas flow path is mixed with cold gas flowing from the ventilation collective duct and is then led to the dust collector, as described above, and the structure further comprises a cooler.

In order to prevent a temperature of exhaust gas flowing into the super heater from undergoing fluctuations, it is preferable that the structure further comprises a thermal storage body disposed on the second exhaust gas flow path at a position upstream from the steam super heater.

It is preferable that the structure further comprises a saturated steam flow rate control valve configured to control a flow rate of saturated steam flowing into the steam super heater, a superheated steam thermometer configured to detect a temperature of superheated steam discharged from the steam super heater, and a controller configured to control the saturated steam flow rate control valve to control a superheated steam amount with reference to the temperature of superheated steam.

It is preferable that the structure further comprises an exhaust gas flow rate meter configured to detect a flow rate of exhaust gas flowing into the steam super heater, an exhaust gas thermometer configured to detect a temperature of exhaust gas flowing into the steam super heater, a saturated steam flow rate meter configured to detect a flow rate of saturated steam flowing into the steam super heater, a flow rate regulating device configured to regulate the flow rate of exhaust gas, and a controller configured to control the flow rate regulating device to control the flow rate of exhaust gas with reference to the temperature of exhaust gas and the flow rate of saturated steam.

According to a second aspect of the present invention, there is provided a steel making electric arc furnace facility comprising a plurality of steel making electric arc furnaces, and a waste heat recovery structure configured to recover waste heat as saturated steam from exhaust gas discharged from the steel making electric arc furnaces and to turn the saturated steam into superheated steam by subsequent heating, the waste heat recovery structure including: a first exhaust gas flow path provided to each of the steel making electric arc furnaces to discharge exhaust gas thereinto; a waste heat boiler disposed on the first exhaust gas flow path and configured to recover waste heat as saturated steam from exhaust gas; a steam accumulator configured to store steam formed by confluence of saturated steam parts, each generated by the waste heat boiler; a steam super heater configured to turn steam, which has been stored in the steam accumulator, into superheated steam by heating; a second exhaust gas flow path configured to lead exhaust gas, which has been treated with waste heat recovery in the waste heat boiler, to the steam super heater to use it for superheating saturated steam and to then discharge it; a third exhaust gas flow path configured to discharge exhaust gas, which has been treated with waste heat recovery in the waste heat boiler, not through the steam super heater; and a switching device configured to switch flow paths for exhaust gas, which has been treated with waste heat recovery, between the second exhaust gas flow path and the third exhaust gas flow path.

According to a third aspect of the present invention, there is provided a waste heat recovery structure for a plurality of steel making electric arc furnaces, which recovers waste heat as saturated steam from exhaust gas discharged from the steel making electric arc furnaces and turns the saturated steam into superheated steam by subsequent heating, the structure comprising: a first exhaust gas flow path provided to each of the steel making electric arc furnaces to discharge exhaust gas thereinto; a waste heat boiler disposed on the first exhaust gas flow path and configured to recover waste heat as saturated steam from exhaust gas; a steam accumulator configured to store steam formed by confluence of saturated steam parts, each generated by the waste heat boiler; a steam super heater configured to turn steam, which has been stored in the steam accumulator, into superheated steam by heating; a second exhaust gas flow path configured to lead exhaust gas, which has been treated with waste heat recovery in the waste heat boiler, to the steam super heater to use it for superheating saturated steam; and an operation section configured to operate the steel making electric arc furnaces to sequentially perform their running operations by staggering them with a predetermined deviation time, wherein the operation section sets the deviation time to minimize changes over time in the number of running furnaces of the steel making electric arc furnaces.

According to a fourth aspect of the present invention, there is provided a waste heat recovery method for a plurality of steel making electric arc furnaces, by use of a waste heat recovery structure that includes a first exhaust gas flow path provided to each of the steel making electric arc furnaces to discharge exhaust gas thereinto; a waste heat boiler disposed on the first exhaust gas flow path and configured to recover waste heat as saturated steam from exhaust gas; a steam accumulator configured to store steam formed by confluence of saturated steam parts, each generated by the waste heat boiler; a steam super heater configured to turn steam, which has been stored in the steam accumulator, into superheated steam by heating; and a second exhaust gas flow path configured to lead exhaust gas, which has been treated with waste heat recovery in the waste heat boiler, to the steam super heater to use it for superheating saturated steam, the method comprising: operating the steel making electric arc furnaces to sequentially perform their running operations by staggering them with a predetermined deviation time, wherein the deviation time is set to minimize changes over time in the number of running furnaces of the steel making electric arc furnaces.

In the third and fourth aspects described above, it is preferable that the deviation time is set within a range in which "$(N-(n-1)\times T)-(A\times(m-(n-1))) < B$" is satisfied for an "n"-th electric arc furnace, where "N" is an arbitrary time after a first one of the steel making electric arc furnaces starts operating, "A" is one steel making time, "B" is an electric power application time, "m" is the number of running operations, and "T" is the deviation time.

Further, in the waste heat recovery structure and waste heat recovery method for steel making electric arc furnaces described above, it is preferable that the deviation time is ⅕ of one steel making time expressed in minute.

In the waste heat recovery structure for steel making electric arc furnaces described above, it is preferable that the structure further includes a third exhaust gas flow path configured to discharge exhaust gas, which has been treated with waste heat recovery in the waste heat boiler, not through the steam super heater; and a switching device configured to switch flow paths for exhaust gas, which has been treated with waste heat recovery, between the second exhaust gas flow path and the third exhaust gas flow path. Further, it is preferable that the waste heat boiler is disposed in a region in which a temperature of exhaust gas flowing through the first exhaust gas flow path is 600° C. or more.

In the waste heat recovery method for steel making electric arc furnaces described above, it is preferable that the method comprises leading exhaust gas, which has been treated with waste heat recovery, through the second exhaust gas flow path to the steam super heater and using heat of this exhaust gas to turn saturated steam into superheated steam; and causing exhaust gas discharged from each of the steel making electric arc furnaces to flow into a third exhaust gas flow path not going through the steam super heater when a temperature of this exhaust gas is low.

According to a fifth aspect of the present invention, there is provided a steel making electric arc furnace facility comprising a plurality of steel making electric arc furnaces, and a waste heat recovery structure configured to recover waste heat as saturated steam from exhaust gas discharged from the steel making electric arc furnaces and to turn the saturated steam into superheated steam by subsequent heating, the waste heat recovery structure including: a first exhaust gas flow path provided to each of the steel making electric arc furnaces to discharge exhaust gas thereinto; a waste heat boiler disposed on the first exhaust gas flow path and configured to recover waste heat as saturated steam from exhaust gas; a steam accumulator configured to store steam formed by confluence of saturated steam parts, each generated by the waste heat boiler; a steam super heater configured to turn steam, which has been stored in the steam accumulator, into superheated steam by heating; a second exhaust gas flow path configured to lead exhaust gas, which has been treated with waste heat recovery in the waste heat boiler, to the steam super heater to use it for superheating saturated steam; and an operation section configured to operate the steel making electric arc furnaces to sequentially perform their running operations by staggering them with a predetermined deviation time, wherein the operation section sets the deviation time to minimize changes over time in the number of running furnaces of the steel making electric arc furnaces.

EMBODIMENT FOR CARRYING OUT THE INVENTION

Embodiments of the present invention will now be described with reference to the accompanying drawings.

First Embodiment

At first, an explanation will be given of a first embodiment.

Figure 1:
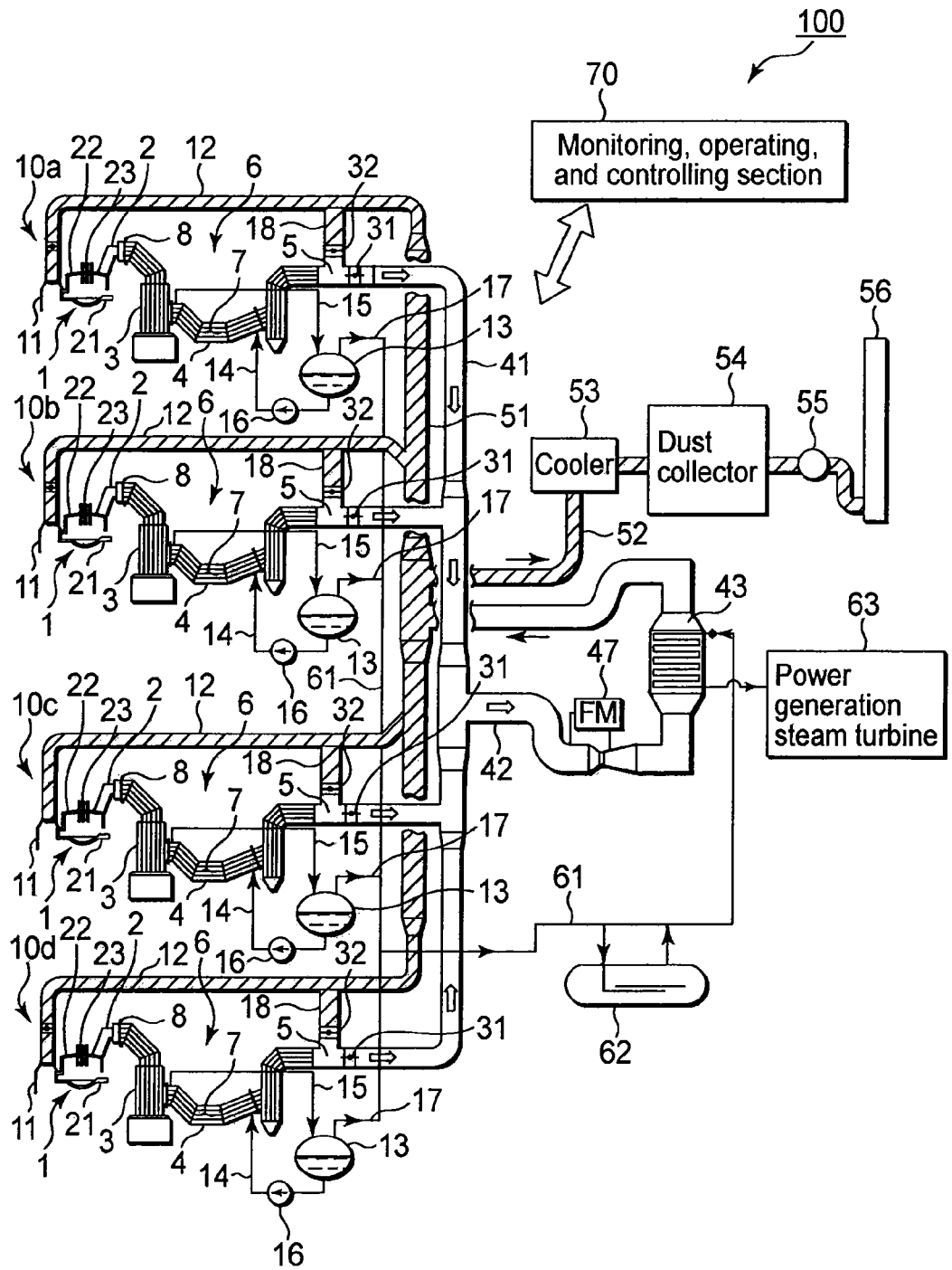
FIG. 1 This is a schematic constitutive view showing a steel making electric arc furnace facility equipped with a waste heat recovery structure for steel making electric arc furnaces according to a first embodiment of the present invention.

FIG. 1 is a schematic constitutive view showing a steel making electric arc furnace facility equipped with a waste heat recovery structure for steel making electric arc furnaces according to an embodiment of the present invention. This steel making electric arc furnace facility 100 includes four electric arc furnace units 10a, 10b, 10c, and 10d. These electric arc furnace units 10a to 10d are installed in a steel making factory (not shown), and each of them includes a steel making electric arc furnace 1 and an exhaust gas duct 2 connected to the steel making electric arc furnace 1. Exhaust gas having a high temperature is discharged from the steel making electric arc furnace 1 and flows into the exhaust gas duct 2. The exhaust gas duct 2 is connected to a front side water-cooled duct 4, and the front side water-cooled duct 4 is connected to a combustion chamber 3 for burning the exhaust gas. The combustion chamber 3 is connected to a rear side water-cooled duct 4, and the rear side water-cooled duct 4 is connected to a duct 5. The exhaust gas duct 2, water-cooled ducts 4, and duct 5 serves as an exhaust gas duct. The front side and rear side water-cooled ducts 4 and combustion chamber 3 constitute a waste heat boiler 6. The waste heat boiler 6 may be formed only of the water-cooled duct 4 or only of the combustion chamber 3. Further, a ventilation hood 11 is disposed around the steel making electric arc furnace 1 of each of the electric arc furnace units, and the ventilation hood 11 is connected to a ventilation duct 12.

In this embodiment, the steel making electric arc furnace 1 includes a furnace body 21, a furnace lid 22 that is openable and closable, and three arc electrodes 23 inserted into the furnace body 21 from above the furnace lid 22, which constitute an electric arc furnace of the three-phase alternate current (AC) type. The steel making electric arc furnace 1 is not limited to this electric arc furnace of the three-phase AC type including three arc electrodes 23, but may be an electric arc furnace including another number of arc electrodes. In operation, a source material, such as iron scrap, DRI, HBI, molten iron, or cold iron (ingot iron), is charged into the furnace body 21, and an electric power is applied to the arc electrodes 23 to generate an electric arc, so as to melt the source material and thereby produce molten steel. Although not shown, the steel making electric arc furnace 1 may be equipped with an oxygen gas blowing lance for refining and/ or a carbon material blowing lance for adding a carbon material.

The combustion chamber 3 of each of the electric arc furnace units is configured to completely burn and thereby detoxify substances, such as carbon monoxide, white smoke substances, and evil smell substances, contained in the exhaust gas having a high temperature discharged from the furnace body 21, by use of air fed through an air feed port 8. Due to combustion heat given at this time, the temperature of the exhaust gas is further increased.

The waste heat boiler 6 of each of the electric arc furnace units is configured to recover waste heat from the exhaust gas (the sensible heat and combustion heat of the exhaust gas in this case) as saturated steam. The waste heat boiler 6 is disposed on a flow path for the exhaust gas discharged from the steel making electric arc furnace 1. The waste heat boiler 6 is preferably disposed in a region in which the exhaust gas temperature is not less than a predetermined temperature. The front side and rear side water-cooled ducts 4 and combustion chamber 3 constituting the waste heat boiler 6 include heat transfer tubes 7.

Further, each of the electric arc furnace units includes a steam drum 13, and the steam drum 13 is connected to a supply piping line 14 for supplying a cooling water (purified water) into the heat transfer tubes 7 and a return piping line 15 for returning the cooling water (steam) from the heat transfer tubes 7 into the steam drum 13. Further, the supply piping line 14 is equipped with a water circulating pump 16. With this arrangement, the cooling water is circulated and supplied through the heat transfer tubes 7. The cooling water stored in the steam drum 13 is sent by the circulating pump 16 through the supply piping line 14 into the heat transfer tubes 7. Then, the cooling water sent in the heat transfer tubes 7 is heated and thereby turned into saturated steam by use of the sensible heat of the exhaust gas given by the steel making electric arc furnace 1 and the combustion heat given by burning the exhaust gas in the combustion chamber 3. The saturated steam is returned through the return piping line 15 into steam drum 13, such that the steam drum 13 contains the gas and liquid in a separate state. The steam drum 13 is connected to a saturated steam transfer piping line 17, so that the saturated steam inside the steam drum 13 is transferred through the saturated steam transfer piping line 17 into an accumulator 62.

The steam drum 13 is connected to a purified water tank (not shown), so that the cooling water (purified water) is supplied from the purified water tank, with suitable timing, to store a predetermined amount of water in the steam drum 13. It should be noted that FIG. 1 shows one set of the supply piping line 14 and return piping line 15 for the sake of convenience, but there are practically a certain number of sets of these lines 14 and 15 corresponding to the number of heat transfer tubes 7 (the number of divided parts of the boiler according to need).

The ducts 5 of the respective electric arc furnace units are connected to an exhaust gas collective duct 41. The exhaust gas collective duct 41 is connected to a single downstream exhaust gas duct 42, so that the exhaust gas parts from the ducts 5 of the respective electric arc furnace units are collectively gathered by the exhaust gas collective duct 41 to the downstream exhaust gas duct 42. The downstream exhaust gas duct 42 is connected to a steam super heater 43 for further heating the saturated steam and thereby turning it into superheated steam. Accordingly, the exhaust gas, which has been treated with the waste heat recovery, is sent through the duct 5, exhaust gas collective duct 41, and downstream exhaust gas duct 42 and is used for heating the saturated steam in the steam super heater 43. The steam super heater 43 will be explained later in detail. The downstream exhaust gas duct 42 is equipped with an exhaust gas flow rate meter 47 at a position upstream from the steam super heater 43. On the other hand, the ventilation ducts 12 of the respective electric arc furnace units are connected to a ventilation collective duct 51. The portion of the downstream exhaust gas duct 42 downstream from the steam super heater 43 is connected to the ventilation collective duct 51. The ventilation collective duct 51 is connected to an exhaust gas dust trapping duct 52. The exhaust gas dust trapping duct 52 is equipped with a dust collector 54 including, e.g., a bag filter and an exhaust gas fan 55. The end of the exhaust gas dust trapping duct 52 is connected to a chimney stack 56 for releasing to atmosphere the exhaust gas that has been treated with dust removal in the dust collector 54. Further, the exhaust gas dust trapping duct 52 may be equipped with an exhaust gas cooler 53 at a position upstream from the dust collector 54, as needed. The exhaust gas cooler 53 is configured to cool the temperature of the exhaust gas to a value not higher than the heat resistance temperature of the dust collector 54.

The saturated steam transfer piping lines 17 of the respective electric arc furnace units are connected to a steam collective piping line 61, so that the saturated steam parts transferred through the saturated steam transfer piping lines are collectively gathered by the steam collective piping line 61. The steam collective piping line 61 is equipped with the steam accumulator 62, so that the saturated steam parts generated in the steam drums 13 of the respective electric arc furnace units are stored in the steam accumulator 62. The portion of the steam collective piping line 61 downstream from the steam accumulator 62 is connected to the steam super heater 43. The steam accumulator 62 may be formed of a single unit as shown in FIG. 1 or alternatively formed of a plurality of units.

Figure 2:
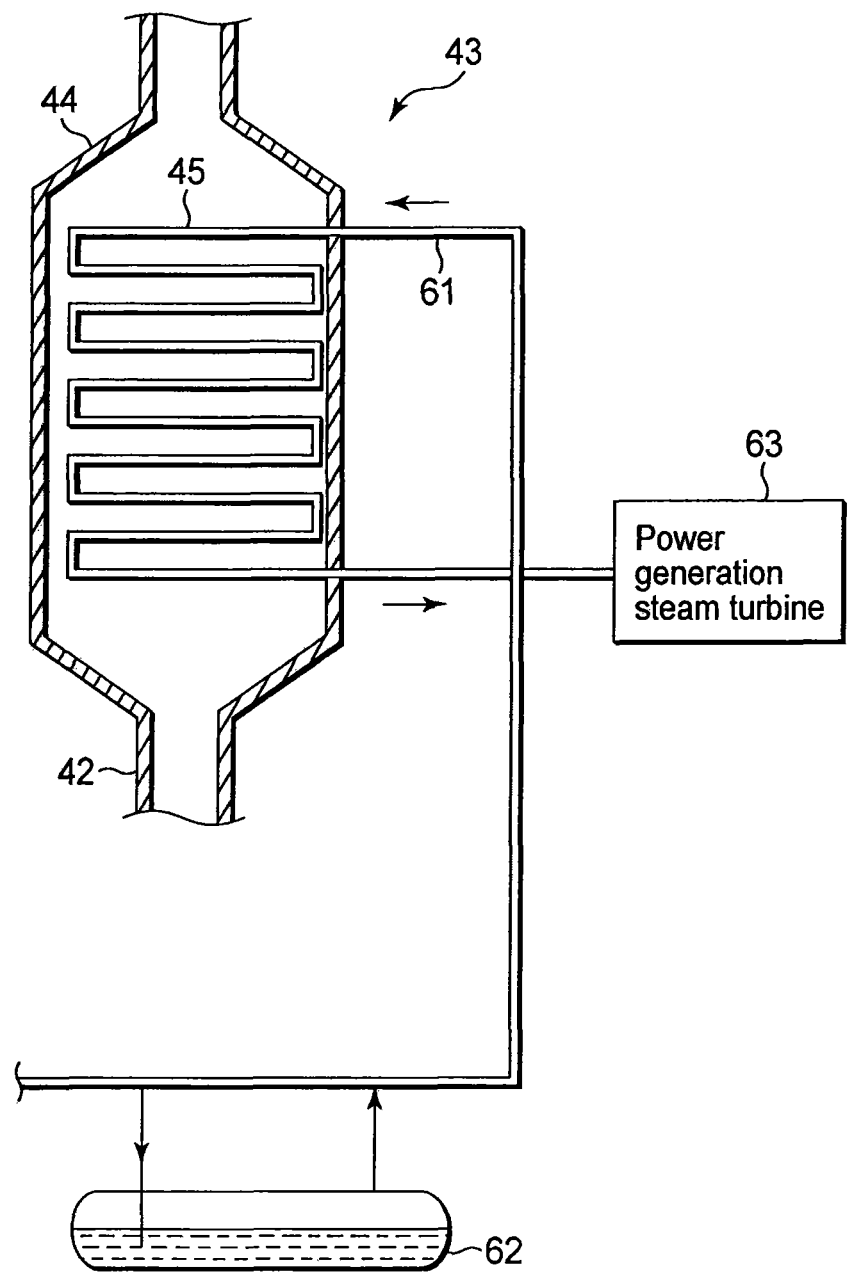
FIG. 2 This is a sectional view showing a steam super heater used in the waste heat recovery structure for steel making electric arc furnaces according to the first embodiment of the present invention.

As shown in FIG. 2, the steam super heater 43 includes a casing 44 and a heat transfer tube 45 disposed inside the casing 44 and bent at a number of positions. The casing 44 is connected to the downstream exhaust gas duct 42, and the exhaust gas having a high temperature flows through the casing 44. On the other hand, the saturated steam from the steam accumulator 62 is supplied into the heat transfer tube 45, so that the saturated steam flowing through the heat transfer tube 45 is heated by the exhaust gas and is turned into superheated steam. In this embodiment, the superheated steam thus generated by the transformation is supplied into a power generation steam turbine 63.

Figure 3A:
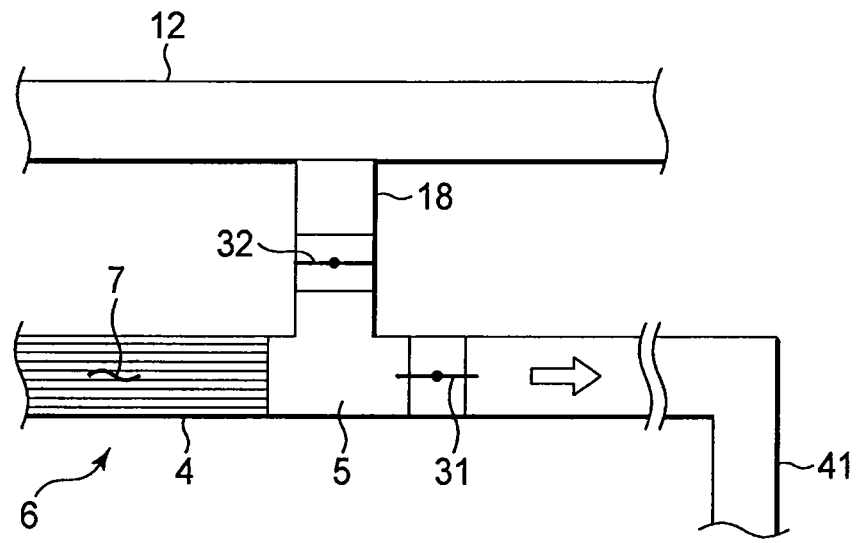
FIG. 3A This is a view for explaining a manner of switching exhaust gas flow paths by use of a damper.
Figure 3B:
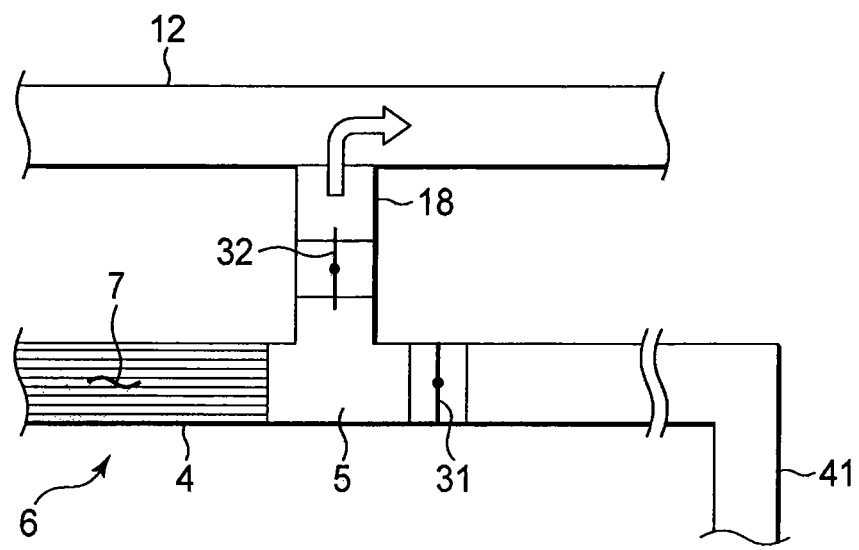
FIG. 3B This is a view for explaining a manner of switching the exhaust gas flow paths by use of the damper.

Each of the electric arc furnace units includes a connection piping line 18 connecting the duct 5 downstream from the waste heat boiler 6 to the ventilation duct 12. The connection piping line 18 is used for the exhaust gas, which has been treated with the waste heat recovery, to flow into the ventilation duct 12. The duct 5 is equipped with a damper 31 at a position downstream from the connected portion to the connection piping line 18. The connection piping line 18 is equipped with a damper 32 at a position near the connected portion to the duct 5. By operating these dampers 31 and 32, the exhaust gas from the steel making electric arc furnace 1 can be switched between an exhaust gas flow path to the steam super heater 43 and an exhaust gas flow path to the ventilation duct 12 that does not go through the steam super heater 43. In other words, the dampers 31 and 32 serve as switching devices for switching the exhaust gas, which has been treated with the waste heat recovery, between an exhaust gas flow path for supply to the steam super heater 43 and an exhaust gas flow path not going through the steam super heater 43. More specifically, during a period in which the exhaust gas temperature is high because the steel making electric arc furnace 1 is in operation, the damper 31 is set open and the damper 32 is set closed to cause the exhaust gas from the steel making electric arc furnace 1 to flow through the duct 5, exhaust gas collective duct 41, and downstream exhaust gas duct 42 into the steam super heater 43, as shown in FIG. 3A. On the other hand, during a period in which the exhaust gas temperature is low because, e.g., the steel making electric arc furnace 1 stops the running operation, the damper 31 is set closed and the damper 32 is set open to cause the exhaust gas having a low temperature from the steel making electric arc furnace 1 to flow through the connection piping line 18 into the ventilation duct 12, as shown in FIG. 3B. As described above, this embodiment is arranged not to supply the exhaust gas having a low temperature from the steel making electric arc furnace 1 to the steam super heater 43, so as to prevent the temperature of the exhaust gas for heating the saturated steam from being lowered.

The constitutive components from each steel making electric arc furnace 1 through the exhaust gas duct 2 to the portions of the combustion chamber 3 and water-cooled ducts 4 constituting the boiler 6 define a first exhaust gas flow path for recovering waste heat from the exhaust gas. The duct 5, exhaust gas collective duct 41, and downstream exhaust gas duct 42 serve as a second exhaust gas flow path for discharging the exhaust gas, which has been treated with the waste heat recovery, through the steam super heater 43. Further, the connection piping line 18, ventilation duct 12, and ventilation collective duct 51 serve as a third exhaust gas flow path for discharging the exhaust gas, which has been treated with the waste heat recovery, not through the steam super heater.

The steel making electric arc furnace facility 100 designed as described above includes a monitoring, operating, and controlling section 70 for monitoring its running operations and operating and controlling its respective portions. This monitoring, operating, and controlling section 70 includes an monitoring unit for figuring out the states of running operations in the steel making electric arc furnace facility 100, an operation panel for operators to perform various manual operations for the running sequence, such as start and stop of applying an electric power to the arc electrodes 23, and a control unit for performing the necessary control in running operations.

Next, an explanation will be give of a process behavior of the steel making electric arc furnace facility 100 designed as described above.

At first, a source material is charged into the furnace body 21 of the steel making electric arc furnace 1, and an electric power is applied to the arc electrodes 23 to start melting the source material by electric arc discharge. This is followed by additional charge of the source material, and refining processes including, e.g., decarburization refining with oxygen gas blowing and component adjustment using carbon material or the like, as needed. When the refining processes are finished, the electric power applied to the arc electrodes 23 is stopped, and then the molten steel is tapped from the furnace body 21. In this way, the running sequence of one heat is finished. This running sequence is repeatedly performed.

In this embodiment, the four electric arc furnace units are installed and respectively include the steel making electric arc furnaces 1, each of which performs the running sequence as described above. However, in general, the four steel making electric arc furnaces 1 are used such that their start timings of the running sequence are not aligned with each other.

In this running sequence, exhaust gas having a high temperature is discharged from each of the steel making electric arc furnaces 1 and passes through the exhaust gas duct 2, front side water-cooled duct 4, combustion chamber 3, and rear side water-cooled duct 4, which constitute the first exhaust gas flow path, during which waste heat (sensible heat and combustion heat) is recovered from the exhaust gas by the waste heat boiler 6. More specifically, the waste heat from the exhaust gas is turned into saturated steam by the heat transfer tubes 7 constituting the waste heat boiler 6, and this saturated steam flows through the steam drum 13, saturated steam transfer piping line 17, and steam collective piping line 61, and is stored in the steam accumulator 62. Then, the saturated steam stored in the steam accumulator is supplied into the steam super heater 43 and is heated by the exhaust gas having a high temperature and is thereby turned into superheated steam. The superheated steam thus generated by the transformation is supplied into the power generation steam turbine 63 and is used for electric power generation.

On the other hand, the exhaust gas, which has been treated with the waste heat recovery, passes through the duct 5, exhaust gas collective duct 41, and downstream exhaust gas duct 42, which constitute the second exhaust gas flow path, into the steam super heater 43, and is used for heating the saturated steam in the steam super heater 43.

The space around the steel making electric arc furnaces 1 and/or the space inside a steel making factory (not shown) are ventilated through the ventilation hood 11 and ventilation duct 12, and the cold gas from the ventilation duct 12 flows into the ventilation collective duct 51. Further, the exhaust gas, which has been used for heating the saturated steam, flows through the downstream exhaust gas duct 42 into the ventilation collective duct 51, and is mixed with the cold gas supplied from the ventilation duct 12. This mixture is supplied into the dust trapping duct 52, and is treated with dust removal in the dust collector 54 and then released from the chimney stack 56. In this way, the exhaust gas dust trapping duct 52 is supplied with exhaust gas having a lowered temperature, which has been formed by confluence of the exhaust gas having a high temperature from the downstream exhaust gas duct 42 with the ventilation cold gas from the ventilation collective duct 51. Consequently, the temperature of the exhaust gas flowing through the dust collector 54 including a bag filter is cooled to a value not higher than the heat resistance temperature of the dust collector 54. Further, as described above, in a case where the exhaust gas dust trapping duct 52 is equipped with the cooler 53 at a position upstream from the dust collector 54, the exhaust gas temperature can be more easily cooled to a value not higher than the heat resistance temperature of the dust collector 54.

Figure 4:
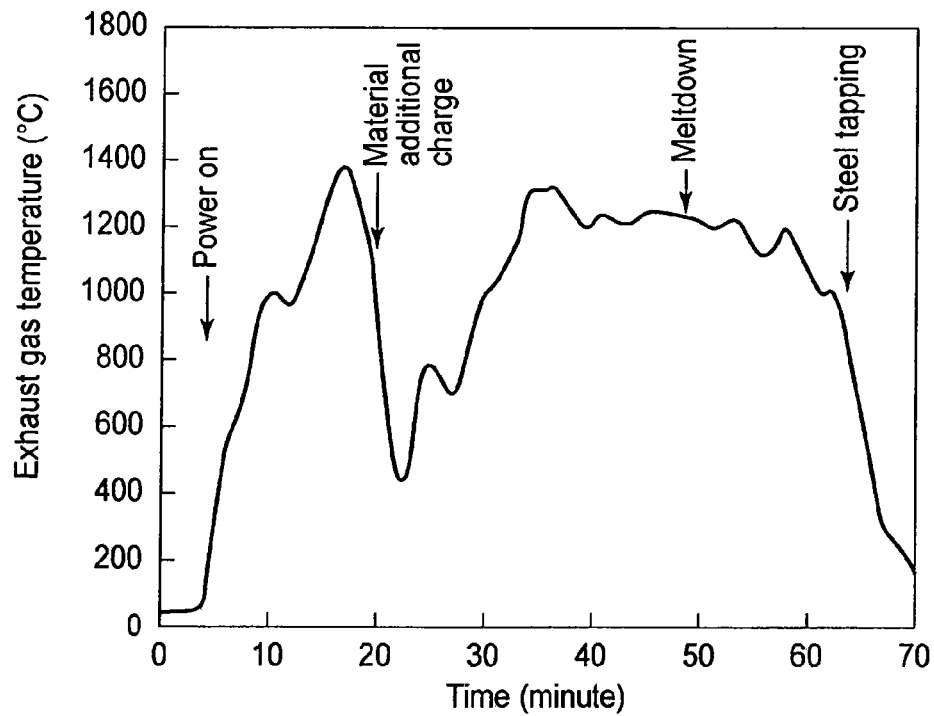
FIG. 4 This is a view showing changes in temperature at the inlet port of a combustion chamber in a steel making electric arc furnace in a case where one heat is set at 70 minutes.

As described above, the running sequence is performed by using, as one heat, a sequence of processes consisting of "source material charge-melting (-source material additional charge-melting-refining)-steel tapping" in each steel making electric arc furnace 1. During this one heat period, the exhaust gas temperature undergoes a lot of fluctuations. FIG. 4 is a view showing changes in temperature at the inlet port of the combustion chamber in a steel making electric arc furnace in a case where one heat is set at 70 minutes. As shown in FIG. 4, after the electric power starts being applied, the exhaust gas temperature increases and reaches to a value of about 1,400° C., and then once decreased to a value of about 400° C. by the source material additional charge. Then, the exhaust gas temperature increases again to a value of about 1,200° C. along with progress of melting of the source material, and maintains a high value during a succeeding period (high temperature period) through a time when the source material is completely melted (meltdown) into a refining period thereafter. On the other hand, the exhaust gas temperature decreases due to the steel tapping after the refining period ends, and reaches to a value of 200° C. or less after the steel tapping is completed. After this steel tapping is completed, the exhaust gas temperature maintains a low value of 200° C. or less during a succeeding period (low temperature period) through a time when the source material is charged for the next heat to a time when the electric power starts being applied for the next heat. As the exhaust gas undergoes such temperature fluctuations, the amount of saturated steam recovered by use of the sensible heat and combustion heat of the exhaust gas becomes inconstant.

However, in this embodiment, the steel making electric arc furnace facility 100 includes the four steel making electric arc furnaces 1, which are used in general such that their start timings of the running sequence are shifted from each other by a predetermined time. In this case, the high temperature periods and the low temperature periods of these four steel making electric arc furnaces 1 do not come at the same time. Further, the saturated steam parts recovered by these four steel making electric arc furnaces 1 are caused to be confluent with each other at the steam accumulator 62, and so the amount of saturated steam obtained by this confluence is equalized. In this respect, the distribution of the amount of saturated steam obtained by the confluence can be set in a desired state by controlling the steel making electric arc furnaces 1 in terms of their timings of the running sequence.

Further, in this embodiment, when the saturated steam is turned into the superheated steam, supply of the heating energy to the steam super heater 43 is performed by use of the exhaust gas, from which waste heat has been recovered. Consequently, there is no need to use any additional fuel for generating the superheated steam, thereby improving the energy economical efficiency.

Figure 5:
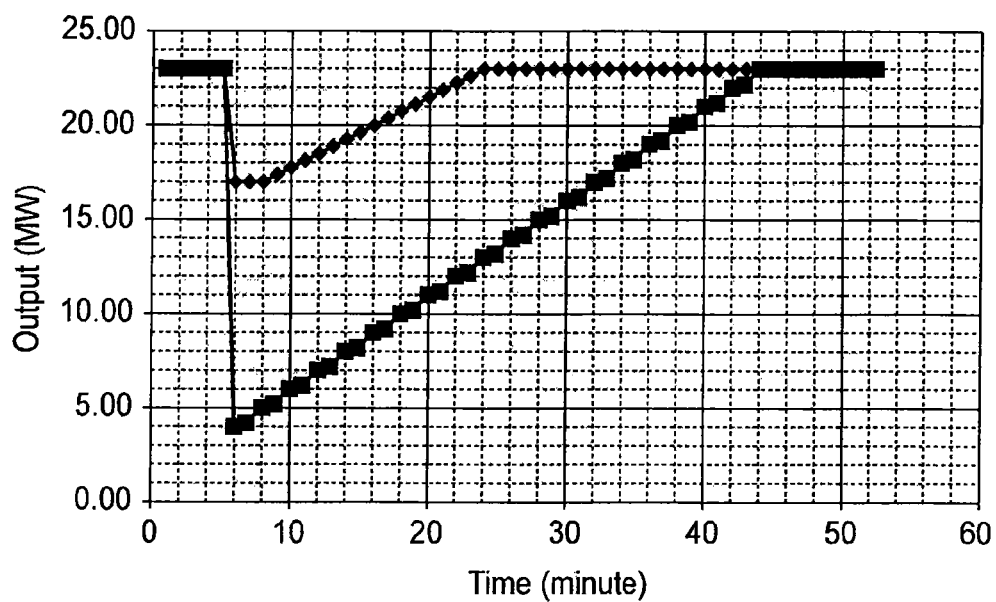
FIG. 5 This is a view for explaining the time necessary for a steam turbine to regain the output after the output is turned down.

Incidentally, when the exhaust gas, which has been treated with the waste heat recovery, is used as a heat source for generating the superheated steam, the exhaust gas needs to have a heat quantity necessary for generating the superheated steam with a predetermined superheat degree. In light of this, it is necessary to prevent the temperature of the exhaust gas supplied into the steam super heater 43 from being lowered, as far as possible. However, the steel making electric arc furnace 1 occasionally discharges exhaust gas having a low temperature. For example, immediately after the electric power application, immediately after the source material additional charge, and after the steel tapping, the steel making electric arc furnace 1 discharges exhaust gas having a low temperature. If this exhaust gas having a low temperature is mixed with exhaust gas having a high temperature discharged from another steel making electric arc furnace in operation, the temperature of this gas mixture becomes lower than the high temperature. When the exhaust gas temperature is thus lowered, a problem arises such that it is short of the heat quantity necessary for generating the superheated steam with a predetermined superheat degree. In this case, the superheated steam flow rate and/or the steam superheat degree are lowered and the steam turbine output is thereby turned down. Consequently, even if the superheated steam flow rate and/or the steam superheat degree are regained thereafter, it takes a long time to restore the steady output, thereby decreasing the amount of generated electric power. For example, as shown in FIG. 5, in a case where the output is 23 MW, if the superheated steam flow rate and/or the steam superheat degree are lowered by a degree corresponding to about 6 MW, it takes about 15 minutes to regain the steady state, and, if they are lowered by a degree corresponding to about 20 MW, it takes about 40 minutes to regain the steady state.

Accordingly, in this embodiment, the connection piping line 18 is disposed to connect the duct 5 downstream from the waste heat boiler 6 to the ventilation duct 12. Further, the dampers 31 and 32 are disposed as switching devices for switching the exhaust gas, which has been treated with the waste heat recovery, between the exhaust gas flow path for supply to the steam super heater 43 and the exhaust gas flow path not going through the steam super heater 43. With this arrangement, during a period (high temperature period) in which the steel making electric arc furnace 1 discharges exhaust gas having a high temperature, the damper 31 is set open and the damper 32 is set closed to supply the exhaust gas into the steam super heater 43, as shown in FIG. 3A. On the other hand, during a period (low temperature period) in which the steel making electric arc furnace 1 discharges exhaust gas having a low temperature, because, e.g., the furnace 1 stops the running operation, the damper 31 is set closed and the damper 32 is set open to lead the exhaust gas from the steel making electric arc furnace 1 into the ventilation duct 12, as shown in FIG. 3B, so as not to supply the exhaust gas from the steel making electric arc furnace 1 into the steam super heater 43. Consequently, it is possible to prevent the temperature of the exhaust gas for generating the superheated steam from being lowered, and thereby to stably generate the superheated steam with a predetermined superheat degree.

In this case, it may be done in advance to figure out the profile of the exhaust gas temperature in one heat, so that, when the exhaust gas temperature becomes lower than a predetermined temperature, the exhaust gas is not supplied into the steam super heater 43.

Figure 6:
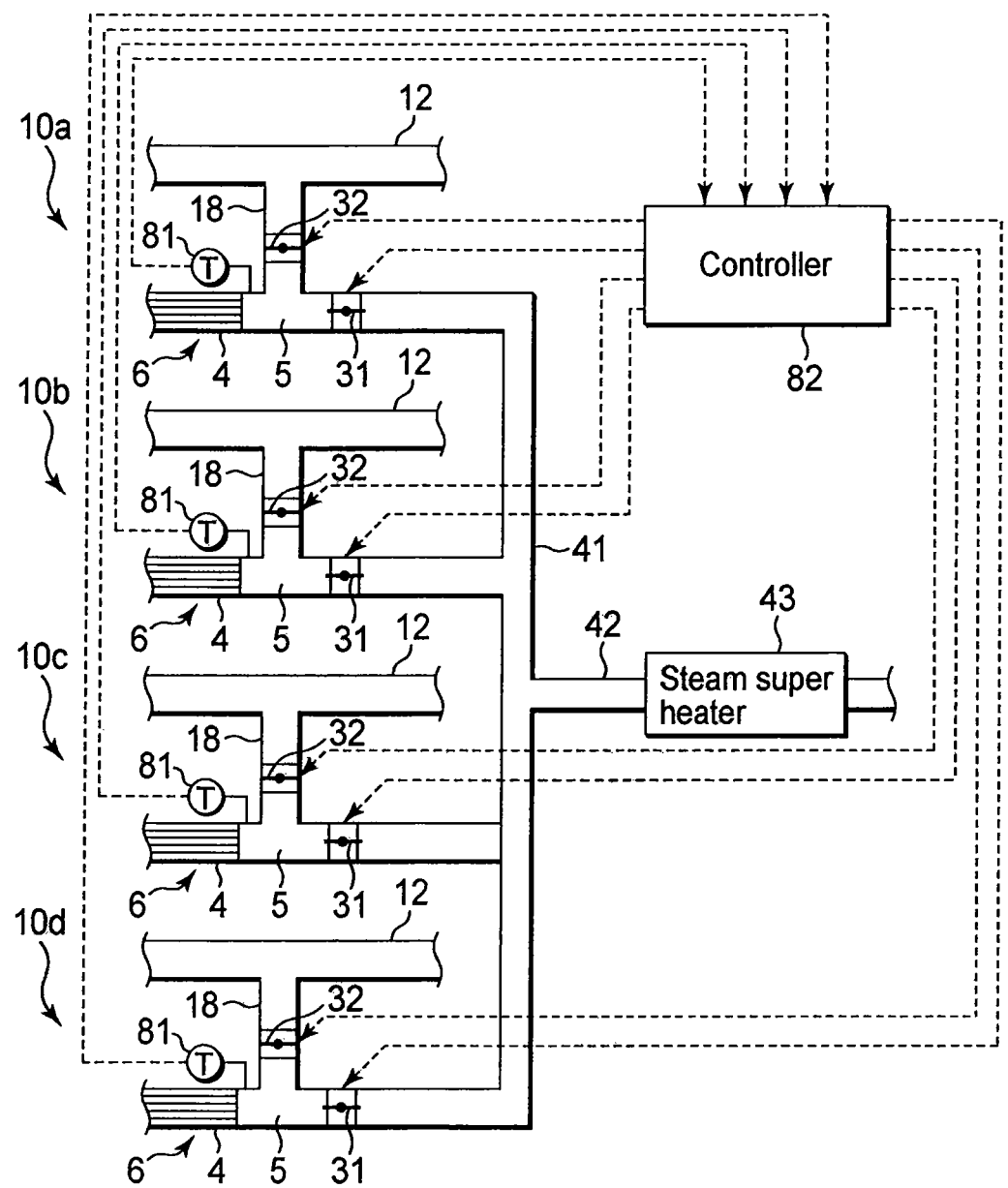
FIG. 6 This is a view for explaining an arrangement preferable for switching the exhaust gas flow paths between an exhaust gas flow path for supply to the steam super heater and an exhaust gas flow path not going through the steam super heater.
Figure 7:
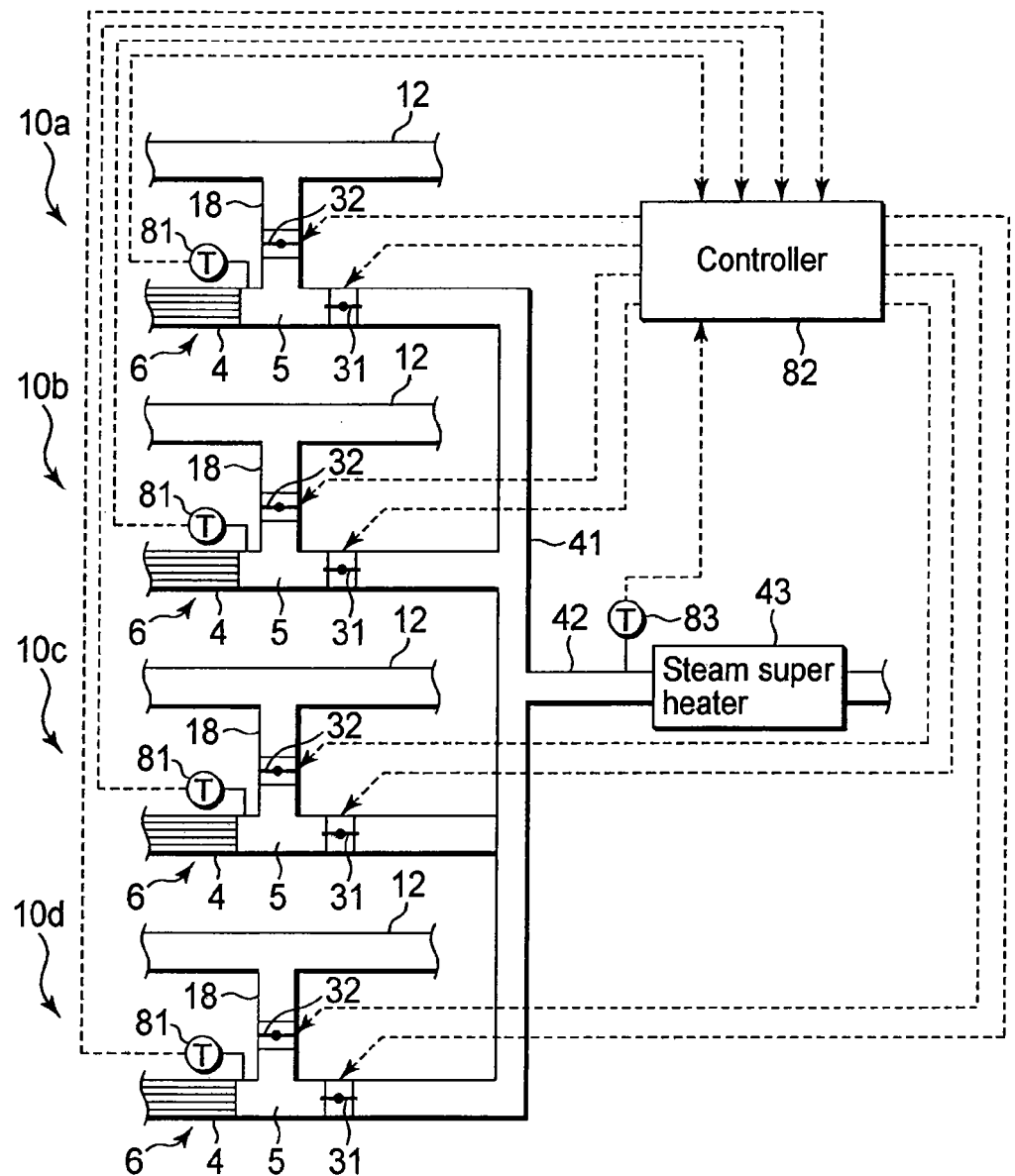
FIG. 7 This is a view for explaining another arrangement preferable for switching the exhaust gas flow paths between an exhaust gas flow path for supply to the steam super heater and an exhaust gas flow path not going through the steam super heater.
Figure 8:
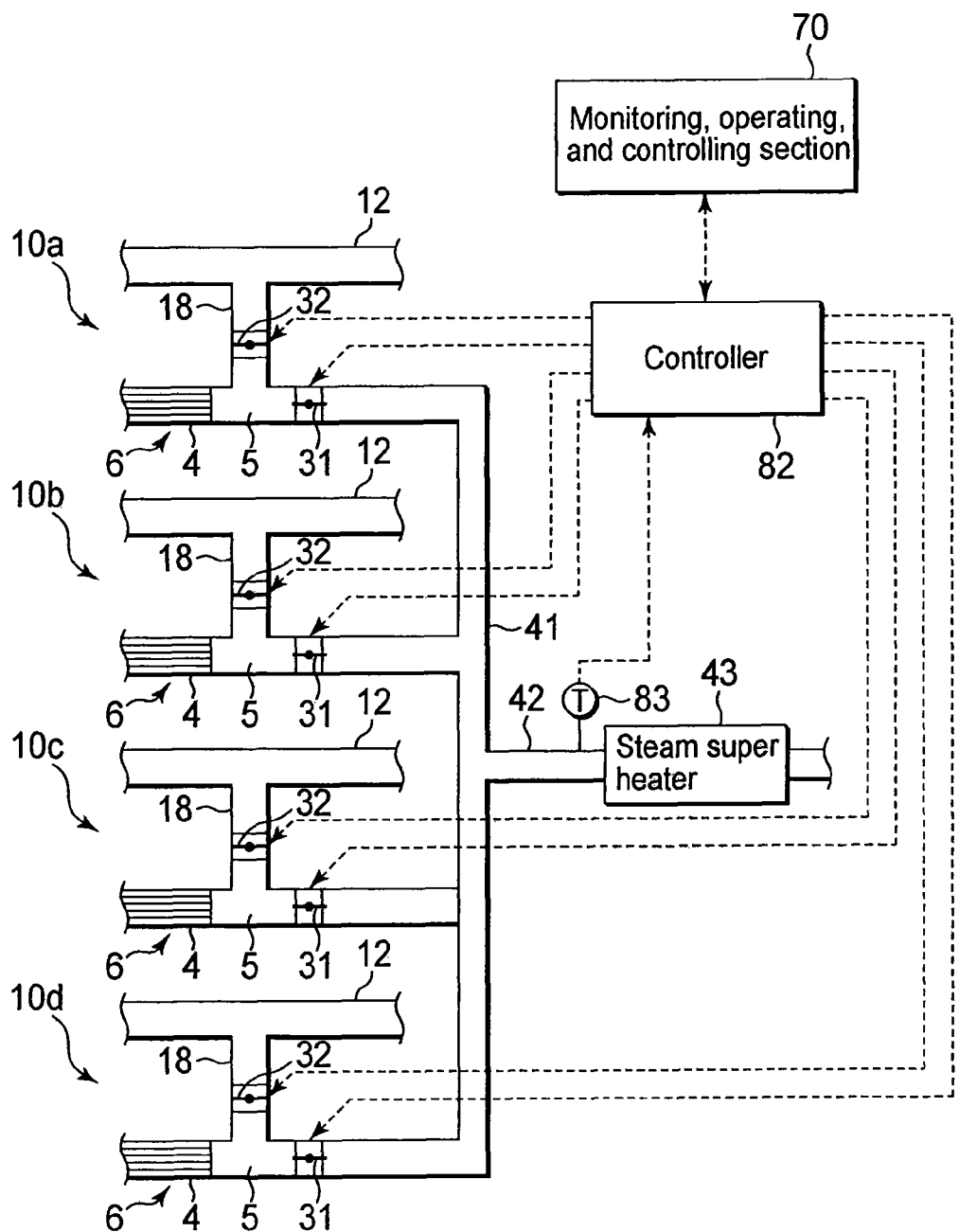
FIG. 8 This is a view for explaining still another arrangement preferable for switching the exhaust gas flow paths between an exhaust gas flow path for supply to the steam super heater and an exhaust gas flow path not going through the steam super heater.

In order to more stably generate the superheated steam, as shown in FIG. 6, each of the electric arc furnace units may be equipped with a thermometer 81 at the outlet port of the waste heat boiler 6, so that, when the temperature detected by the thermometer 81 becomes lower than a predetermined temperature, the dampers 31 and 32 of the corresponding steel making electric arc furnace 1 are operated not to supply the exhaust gas into the steam super heater 43. In this case, as shown in FIG. 6, a controller 82 is preferably disposed such that the controller 82 receives output signals from the thermometer 81 and automatically operates the dampers 31 and 32 based on the signals. Further, as shown in FIG. 7, a thermometer 83 may be disposed, in addition to the thermometer 81, at the inlet port of the steam super heater 43. In this case, when the temperature detected by the thermometer 83 becomes lower than a predetermined temperature, the dampers 31 and 32 are operated not to supply the exhaust gas into the steam super heater 43 from one or more of the electric arc furnace units, in which the temperature at the thermometer 81 is lower than the predetermined temperature. At this time, this operation is preferably controlled by the controller 82. Further, as shown in FIG. 8, only the thermometer 83 may be disposed, so that, when the temperature detected by the thermometer 83 becomes lower than a predetermined temperature, the running sequence states of the four steel making electric arc furnaces 1 are figured out, and, then, for the electric arc furnace unit corresponding to a steel making electric arc furnace 1 set in the low temperature period, the dampers 31 and 32 are operated not to supply the exhaust gas therefrom into the steam super heater 43. At this time, the controller 82 preferably refers to information from the monitoring, operating, and controlling section 70 to give instructions for operating the dampers 31 and 32 to the electric arc furnace unit corresponding to a steel making electric arc furnace 1 set in the low temperature period.

Next, an explanation will be given of the region for defining the waste heat boiler 6.

In a case where the exhaust gas is used as a heat source for generating the superheated steam after the sensible heat and combustion heat of the exhaust gas are recovered, the heat quantity thereof is determined by the generated saturated steam amount, the superheat degree, and the heat dissipation of the pipe line extending from the waste heat boiler 6 to the steam super heater 43. Here, it is assumed that saturated steam of 215° C. is turned into superheated steam of 350° C., while the heat quantity at the inlet port of the waste heat boiler 6 is defined as 100%. With this assumption, the necessary heat quantity becomes 5 to 10% thereof to superheat the generated steam, with an absorbed heat quantity of 50 to 55% at the waste heat boiler 6. Further, in consideration of the heat dissipation of the pipe line or the like, the region for defining the waste heat boiler 6 is a region in which the exhaust gas temperature at the outlet port of the waste heat boiler 6 is 500° C. or more.

Incidentally, the waste heat boiler 6 for the steel making electric arc furnace relies on heat exchange mainly due to radiant heat transfer, and so the heat exchange amount due to radiant heat transfer is approximately expressed by the following formula (1).

$$Q=CA[(Tg/100)^4-(Tw/100)^4] \quad (1)$$

where Q: radiant heat transfer quantity,
Tg: gas temperature,
Tw: water-cooled tube wall surface temperature,
A: effective radiant heat transfer area, and
C: effective radiant coefficient.

Although actual radiant heat transfer is a complex phenomenon, it can be assumed that the effective radiant coefficient remains unchanged. With this assumption, in order to obtain an absorption heat quantity equal to the heat quantity absorbed at a gas temperature of 1,000° C., the effective radiant heat transfer area needs to be about 2.5 times when the exhaust gas temperature is 800° C., and it needs to be about 8 times when the exhaust gas temperature is 600° C. Thus, it is not economical to expand the region for the waste heat boiler 6 to a position where the exhaust gas temperature is lower than 600° C., because the recovered steam amount is smaller relative to the increase rate in the heat transfer area. In light of this matter as well as the heat balance described above, the region for disposing the waste heat boiler 6 is preferably a region in which the exhaust gas temperature is 600° C. or more, and more preferably a region in which the exhaust gas temperature is 700° C. or more.

Figure 9:
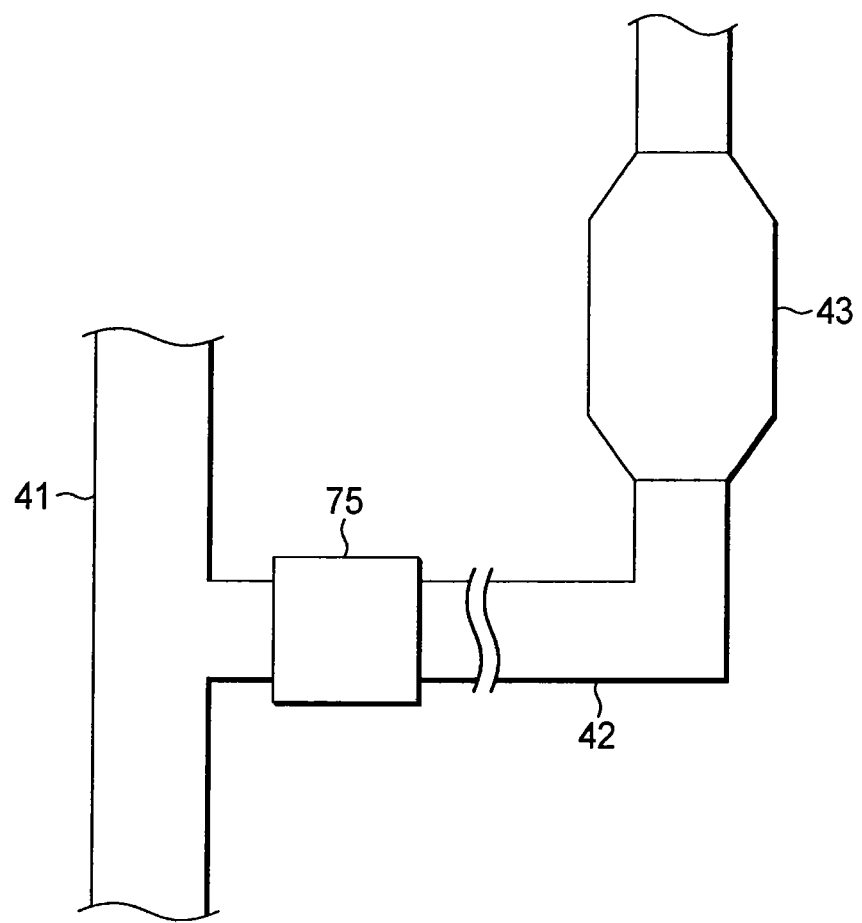
FIG. 9 This is a view showing an example in which a thermal storage body is disposed on a downstream exhaust gas duct at a position upstream from the steam super heater in the waste heat recovery structure for steel making electric arc furnaces according to the first embodiment of the present invention.

The facility shown in FIG. 1 may be modified as shown in FIG. 9, such that a thermal storage body 75 is additionally disposed on the downstream exhaust gas duct 42 at a position upstream from the steam super heater 43, so that the exhaust gas flows through the thermal storage body 75.

The thermal storage body 75 may be formed of a block body having a large thermal capacity, such as a checker brick. Further, it is more preferably to use a checker having a special shape that has a large heat transfer area to store a larger amount of heat in a thermal storage cell having the same volume. As described above, the dampers 31 and 32 are operated not to supply exhaust gas having a low temperature to the steam super heater 43, so as to prevent the temperature of the exhaust gas supplied into the steam super heater 43 from being lowered, as far as possible. Even so, the exhaust gas temperature still undergoes fluctuations to some extent. In this respect, the thermal storage body 75 can store a larger amount of heat from exhaust gas having a high temperature. Accordingly, even if the exhaust gas temperature undergoes fluctuations, the thermal storage body 75 supplies heat to the exhaust gas when the exhaust gas passes through the thermal storage body 75, and so the temperature of the exhaust gas supplied into the steam super heater 43 undergoes less fluctuations. Consequently, the fluctuations in the exhaust gas temperature become very small, and the steam temperature at the steam super heater 43 becomes more uniform.

Figure 10:
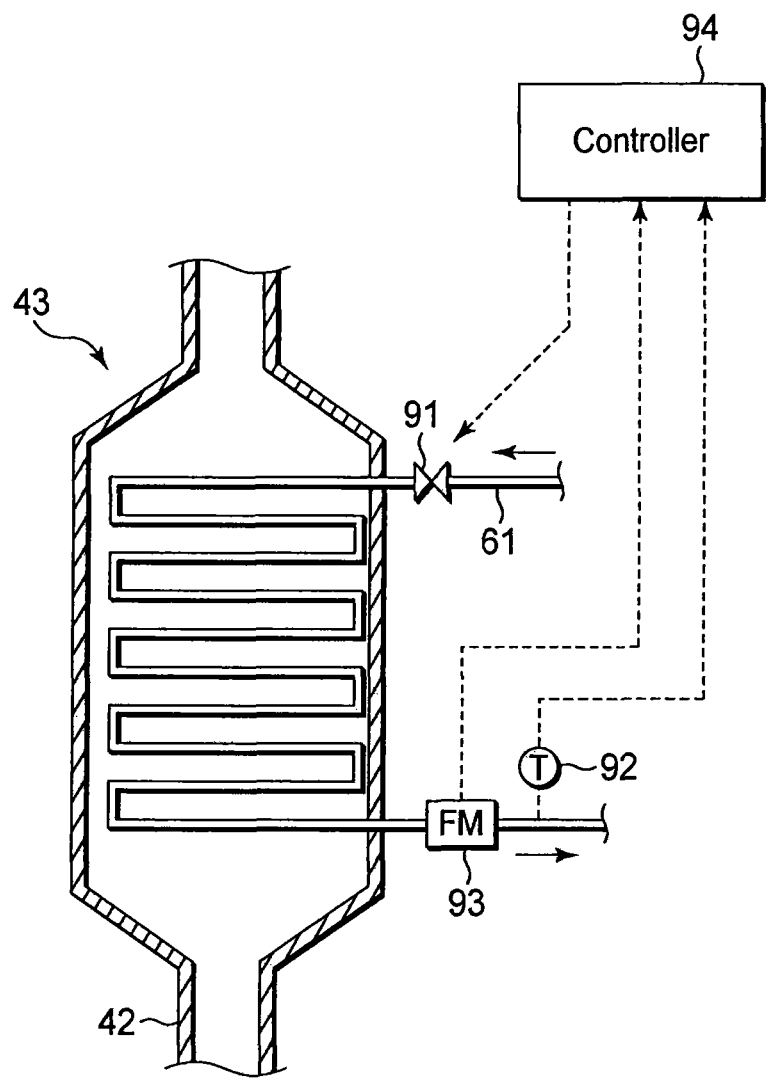
FIG. 10 This is a view showing an example in which a controller for controlling the saturated steam flow rate for supply in the waste heat recovery structure for steel making electric arc furnaces according to the first embodiment of the present invention.

Further, as shown in FIG. 10, it may be arranged such that a saturated steam flow rate control valve 91 is disposed at the inlet port of the steam super heater 43, and a superheated steam thermometer 92 and a superheated steam flow rate meter 93 are disposed at the outlet port of the steam super heater 43. Further, a controller 94 is disposed to control the saturated steam flow rate control valve 91 with reference to signals from the superheated steam thermometer 92, so as to control the flow rate of the saturated steam to be supplied.

In this case, the saturated steam flow rate is controlled by the saturated steam flow rate control valve 91 to set the superheated steam amount in accordance with the superheated steam temperature, so that the superheat degree of the superheated steam becomes constant. In place of the use of the superheated steam flow rate meter 93, it may be arranged such that the relationship between the opening degree of the saturated steam flow rate control valve 91 and the saturated steam amount is obtained in advance and preset in the controller 94, and the opening degree of the saturated steam flow rate control valve 91 is controlled to set the saturated steam flow rate in accordance with the superheated steam temperature.

Figure 11:
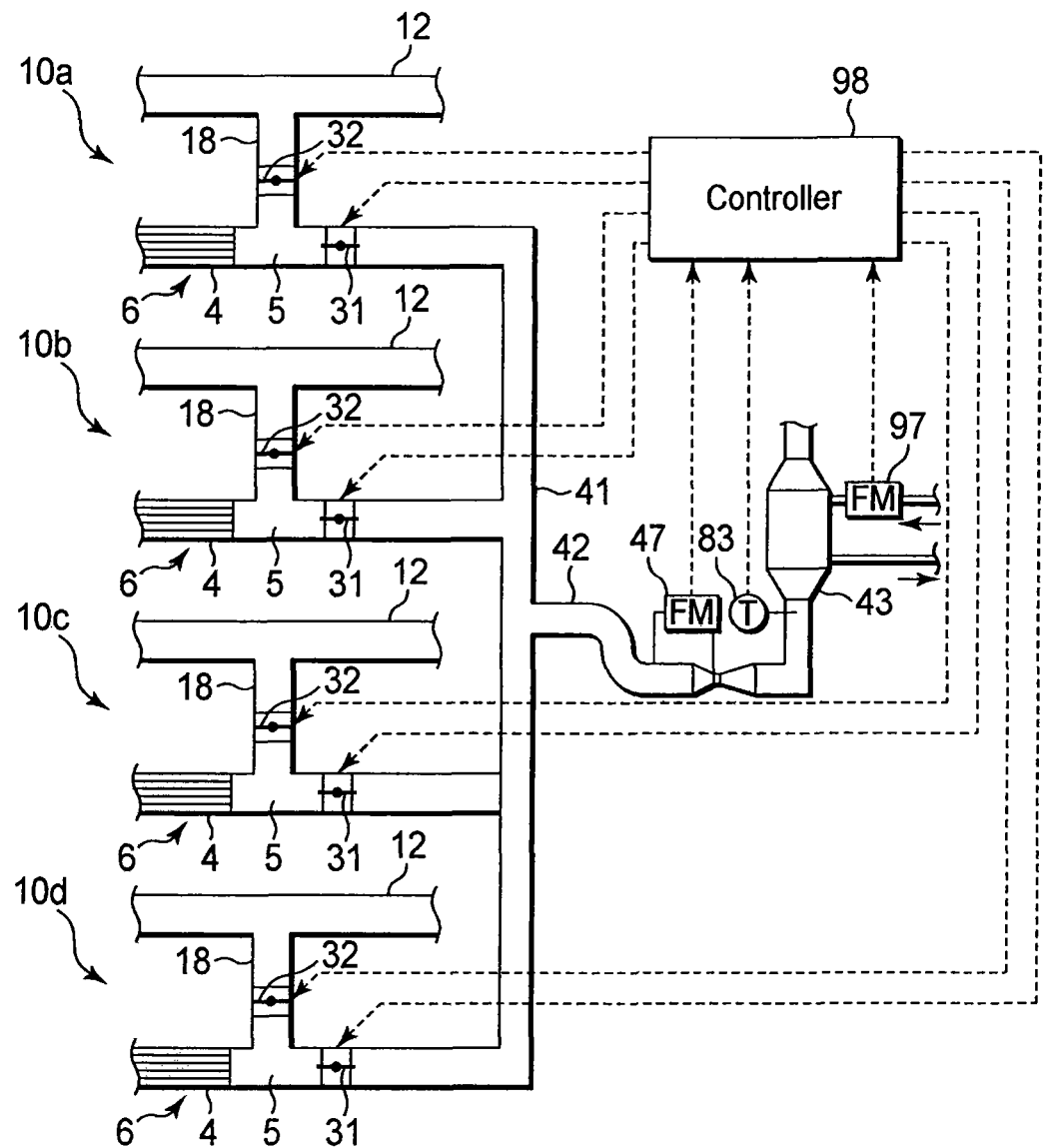
FIG. 11 This is a view showing an example in which a controller for controlling the exhaust gas flow rate in the waste heat recovery structure for steel making electric arc furnaces according to the first embodiment of the present invention.

Further, as shown in FIG. 11, it may be arranged such that an exhaust gas thermometer 83 is disposed at the exhaust gas inlet port of the steam super heater 43, a saturated steam flow rate meter 97 is disposed at the steam inlet port of the steam super heater 43, and a controller 98 is disposed to control the exhaust gas flow rate. In this case, the controller 98 may receive inputs of signals from the exhaust gas thermometer 83 and the saturated steam flow rate meter 97 and signals from the exhaust gas flow rate meter 47 disposed on the downstream exhaust gas duct, so that the controller 98 controls the opening degrees of the dampers 31 and 32 with reference to signals from the exhaust gas thermometer 83 and the saturated steam flow rate meter 97.

Consequently, the flow rate of the exhaust gas supplied into the steam super heater 43 can be controlled in accordance with the saturated steam flow rate.

The exhaust gas from the steel making electric arc furnace contains nitrogen, oxygen, and carbon dioxide as the main components, which do not so much vary depending on the running sequence, and so its specific heat undergoes less fluctuations due to the variation in gas component. Accordingly, if the relationship between the gas temperature and the specific heat is measured in advance, the thermal energy amount of the exhaust gas can be figured out only by measuring the exhaust gas flow rate and the exhaust gas temperature. In other words, if the exhaust gas flow rate and the exhaust gas temperature are measured, the thermal energy necessary for generating the superheated steam, which is based on the amount of saturated steam flowing through the steam super heater 43 and the required superheat degree, can be controlled by use of the amount of exhaust gas flowing into the steam super heater 43. Consequently, the superheated steam can be generated with an almost constant superheat degree, and the power generation turbine 63 of the steam turbine type can be thereby driven with a very high efficiency. In this case, a thermometer may be disposed at the outlet port of the waste heat boiler 6 of each of the electric arc furnace units, so that the temperature of the exhaust gas is precisely detected when the flow rate of the exhaust gas is controlled, and thus the degree of accuracy is improved. Further, since the thermal energy of the exhaust gas for superheating the saturated steam is controlled, as described above, it is possible to prevent such problems that the superheated steam is over-superheated and that the exhaust gas has a temperature too high and burns out the dust collector after passing through the steam super heater 43.

According to this embodiment described above, the saturated steam parts respectively generated by the waste heat boilers respectively disposed in a plurality of steel making electric arc furnaces are caused to be confluent with each other. Consequently, the amount of steam obtained by this confluence is equalized, even if the steam generation amount is inconstant in the running sequence of each of the steel making electric arc furnaces. Further, when the saturated steam is turned into the superheated steam by heating, supply of the heating energy for this is performed by use of the exhaust gas, from which waste heat has been recovered. Consequently, there is no need to use any additional fuel for generating the superheated steam, thereby improving the energy economical efficiency. Further, when the superheated steam is generated, during a period in which the steel making electric arc furnace discharges exhaust gas having a low temperature, the exhaust gas is caused by switching to flow into the exhaust gas flow path not going through the steam super heater. Consequently, it is possible to prevent the temperature of the exhaust gas for heating the saturated steam from being lowered, and thereby to stably generate the superheated steam with a predetermined superheat degree.

Second Embodiment

In the second embodiment, the steel making electric arc furnace facility 100 shown in FIG. 1, which is designed as explained in the first embodiment, is used, while the running operation timings of a plurality of steel making electric arc furnaces are controlled with a high degree of accuracy.

Figure 12:
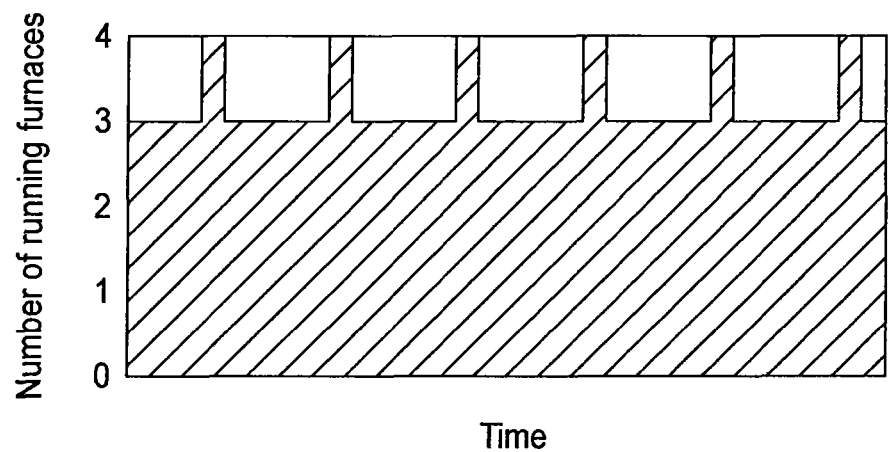
FIG. 12 This is a view for explaining an example of setting "deviation time" for steel making electric arc furnaces according to a second embodiment of the present invention.

In this embodiment, the monitoring, operating, and controlling section 70 of the steel making electric arc furnace facility 100 switches the exhaust gas flow paths with reference to, e.g., the temperature at the outlet port of the waste heat boiler 6. Further, the monitoring, operating, and controlling section 70 controls the four steel making electric arc furnaces 1 to sequentially perform their running operations by staggering them with a predetermined "deviation time". The "deviation time" used for this is set to minimize the changes over time in the number of running furnaces of the four steel making electric arc furnaces 1, and to maximize the value obtained by temporally integrating the changes in the number of running furnaces of the steel making electric arc furnaces 1. More specifically, as shown in FIG. 12, in which the horizontal axis denotes the elapsed time and the vertical axis denotes the number of running furnaces of the steel making electric arc furnaces 1, the "deviation time" mentioned above is set to minimize the changes in the number of furnaces in operation of the steel making electric arc furnaces 1 and to maximize the areal value of the shaded part shown in FIG. 12.

Such a "deviation time" may be obtained in advance by the control unit of the monitoring, operating, and controlling section 70 in accordance with the running sequence conditions. An operator may operate the four steel making electric arc furnaces 1 by an operation section to sequentially performs their running operations based on the value of the "deviation time" thus obtained. Alternatively, the control unit of the monitoring, operating, and controlling section 70 may automatically control the four steel making electric arc furnaces 1 to sequentially performs their running operations based on the value of the "deviation time" thus obtained.

Next, an explanation will be given of the process behavior of the steel making electric arc furnace facility 100 according to this embodiment.

At first, basically as in the first embodiment, a source material is charged into the furnace body 21 of the steel making electric arc furnace 1, and an electric power is applied to the arc electrodes 23 to start melting the source material by electric arc discharge. This is followed by additional charge of the source material, and refining processes including, e.g., decarburization refining with oxygen gas blowing and component adjustment using carbon material or the like, as needed. When the refining processes are finished, the electric power applied to the arc electrodes 23 is stopped, and then the molten steel is tapped from the furnace body 21. In this way, the running sequence of one heat is finished. This running sequence is repeatedly performed.

Such a running sequence is performed as described previously in the four steel making electric arc furnaces 1 of the electric arc furnace units, while, in this embodiment, the four steel making electric arc furnaces 1 are controlled to sequentially perform their running operations by staggering them with a predetermined "deviation time". The "deviation time" used for this is set to minimize the changes over time in the number of furnaces in operation (the number of running furnaces) of the four steel making electric arc furnaces 1, and to maximize the value obtained by temporally integrating the changes in the number of running furnaces of the steel making electric arc furnaces. This matter will be explained later in detail.

In this running sequence, exhaust gas having a high temperature is discharged from each of the steel making electric arc furnaces 1 and passes through the exhaust gas duct 2, front side water-cooled duct 4, combustion chamber 3, and rear side water-cooled duct 4, which constitute the first exhaust gas flow path, during which waste heat (sensible heat and combustion heat) is recovered therefrom by the waste heat boiler 6, as in the first embodiment.

On the other hand, the exhaust gas, which has been treated with the waste heat recovery, passes through the duct 5, exhaust gas collective duct 41, and downstream exhaust gas duct 42, which constitute the second exhaust gas flow path, into the steam super heater 43, and is used for heating the saturated steam in the steam super heater 43, as in the first embodiment.

Further, as in the first embodiment, the space around the steel making electric arc furnaces 1 and/or the space inside a steel making factory (not shown) are ventilated through the ventilation hood 11 and ventilation duct 12, and the cold gas from the ventilation duct 12 flows into the ventilation collective duct 51. Further, after heating the saturated steam, the exhaust gas flows through the downstream exhaust gas duct 42 into the ventilation collective duct 51, and is mixed with the cold gas supplied from the ventilation duct 12. This mixture is supplied into the dust trapping duct 52, and is treated with dust removal in the dust collector 54 and then released from the chimney stack 56.

As described above, the running sequence is performed by using, as one heat, a sequence of processes consisting of "source material charge-melting (-source material additional charge-melting-refining)-steel tapping" in each steel making electric arc furnace 1. During this one heat period, the exhaust gas temperature undergoes a lot of fluctuations, as shown in FIG. 4 described above.

However, this embodiment as well as the first embodiment includes a plurality of (four in this embodiment) steel making electric arc furnaces 1, which are used in general such that their start timings of the running sequence are shifted from each other by a predetermined time. In this case, the high temperature periods and the low temperature periods of these four steel making electric arc furnaces 1 do not come at the same time. Accordingly, even without a special running operation timing adjustment, since the saturated steam parts recovered by these four steel making electric arc furnaces 1 are caused to be confluent with each other at the steam accumulator 62, the amount of saturated steam obtained by this confluence is equalized to some extent.

Further, as in the first embodiment, when the saturated steam is turned into the superheated steam, supply of the heating energy to the steam super heater 43 is performed by use of the exhaust gas, from which waste heat has been recovered. Consequently, there is no need to use any additional fuel for generating the superheated steam, thereby improving the energy economical efficiency.

However, a plurality of steel making electric arc furnaces 1 are used, and the steel making electric arc furnaces 1 perform intermittent running operations, as described above. In this case, if the running operation start timings of the electric arc furnaces are set without reference to the mutual relationship of the running operation periods of the furnaces, the number of running furnaces of the electric arc furnaces varies depending on the period such that there occurs a period in which all the furnaces perform the running operations or stop the running operations together at a time. Consequently, the amount of steam recovered by the waste heat boilers 6 and/or the gas temperature at the inlet port of the super heater 43 undergo fluctuations that cannot be negligible, and so the effect of equalization described above is limited.

In light of the matter described above, this embodiment causes the four steel making electric arc furnaces 1 to sequentially perform their running operations by staggering them with a predetermined "deviation time". This "deviation time" is set to minimize the changes in the number of furnaces in operation (the number of running furnaces) of the four steel making electric arc furnaces 1. Consequently, it is possible to minimize the variation in the confluent steam amount at the steam accumulator 62, and thereby to uniformize the amount of superheated steam thus generated. Further, it is set to maximize the value obtained by temporally integrating the changes over time in the number of furnaces in operation (the number of running furnaces) of the steel making electric arc furnaces 1 (i.e., the area of the shaded part shown in FIG. 12), and thereby to maximize the steam amount itself.

More specifically, where "N" is an arbitrary time after the first one (first furnace) of the steel making electric arc furnaces 1 starts operating, "A" is one steel making time (Tap to tap), "B" is the electric power application time, "m" is the number of running operations, and "T" is the deviation time, the deviation time T is optimized within a range in which the following formulas (2) to (5) are satisfied:

The first electric arc furnace:

$$N - A \times m < B \quad (2)$$

The second electric arc furnace:

$$(N-T) - (A \times (m-1)) < B \quad (3)$$

The third electric arc furnace:

$$(N-2 \times T) - (A \times (m-2)) < B \quad (4)$$

The fourth electric arc furnace:

$$(N-3 \times T) - (A \times (m-3)) < B \quad (5)$$

Consequently, it is possible to obtain the most stable running operation pattern that minimizes the changes in the number of furnaces in operation (the number of running furnaces) of the four steel making electric arc furnaces 1, wherein this pattern allows the number of furnaces in operation of the steel making electric arc furnaces to be set at the highest rate.

To generalize formulas (2) to (5) mentioned above, the formula (6) shown below is applied to the "n"-th electric arc furnace. This formula can be applied to a case where the number of steel making electric arc furnaces 1 is not 4, unlike this embodiment.

$$(N-(n-1) \times T) - (A \times (m-(n-1))) < B \quad (6)$$

Figure 13:
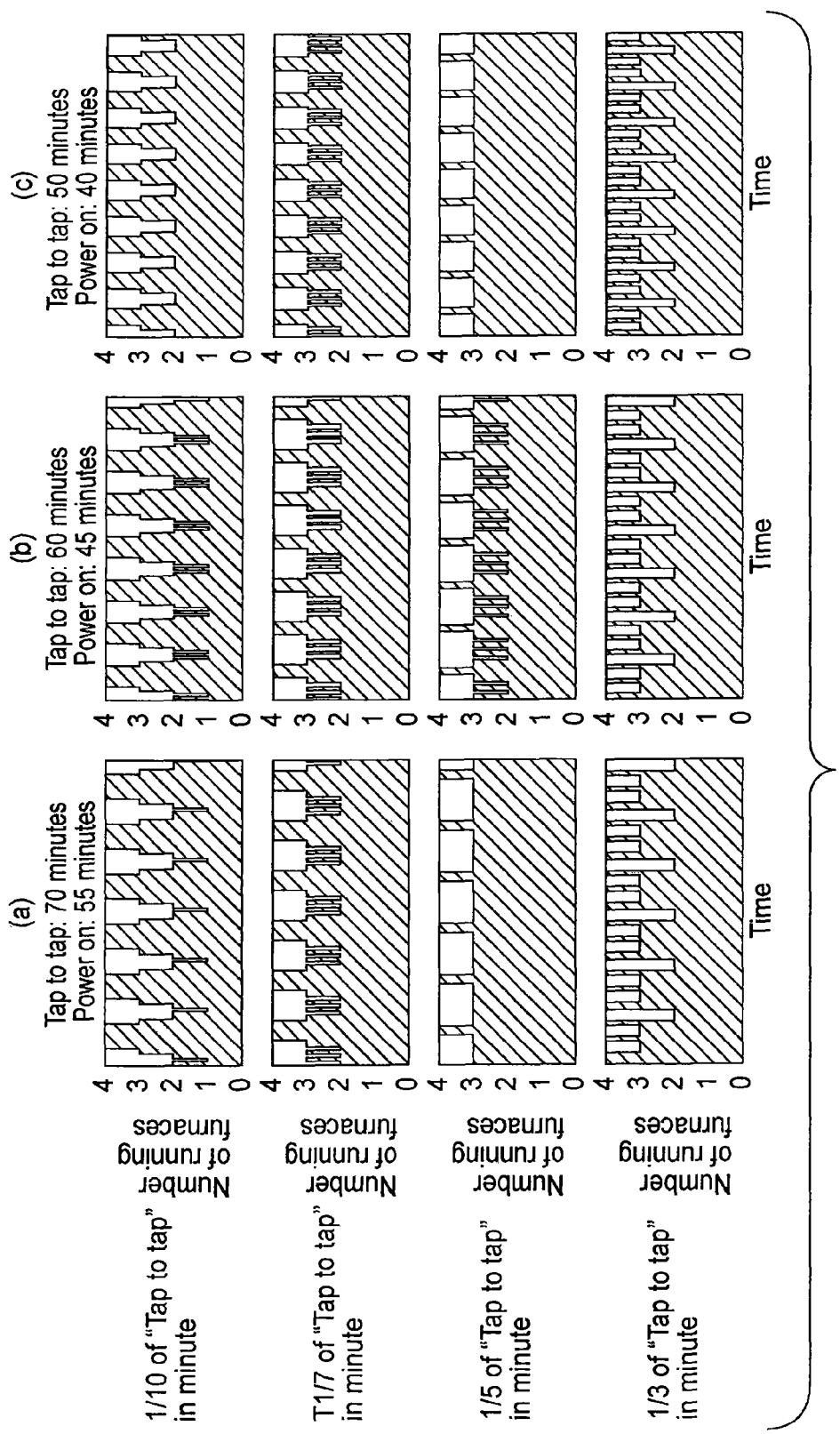
FIG. 13 This is a view showing results of simulations on changes over time in the number of running furnaces, on the premise that four steel making electric arc furnaces were used according to the second embodiment of the present invention, and further in cases where one heat was differently arranged such that (a) the steel making time (Tap to tap) was set at 70 minutes along with the electric power application time set at 55 minutes, (b) the steel making time (Tap to tap) was set at 60 minutes along with the electric power application time set at 45 minutes, and (c) the steel making time (Tap to tap) was set at 50 minutes along with the electric power application time set at 40 minutes; while the deviation time T was set at different values defined by $1/10$, $1/7$, $1/5$, and $1/3$ of "Tap to tap" expressed in minute.

If the deviation time T described above is changed under various running operation conditions, running operation patterns can be formed, as shown in FIG. 13.

Figure 14:
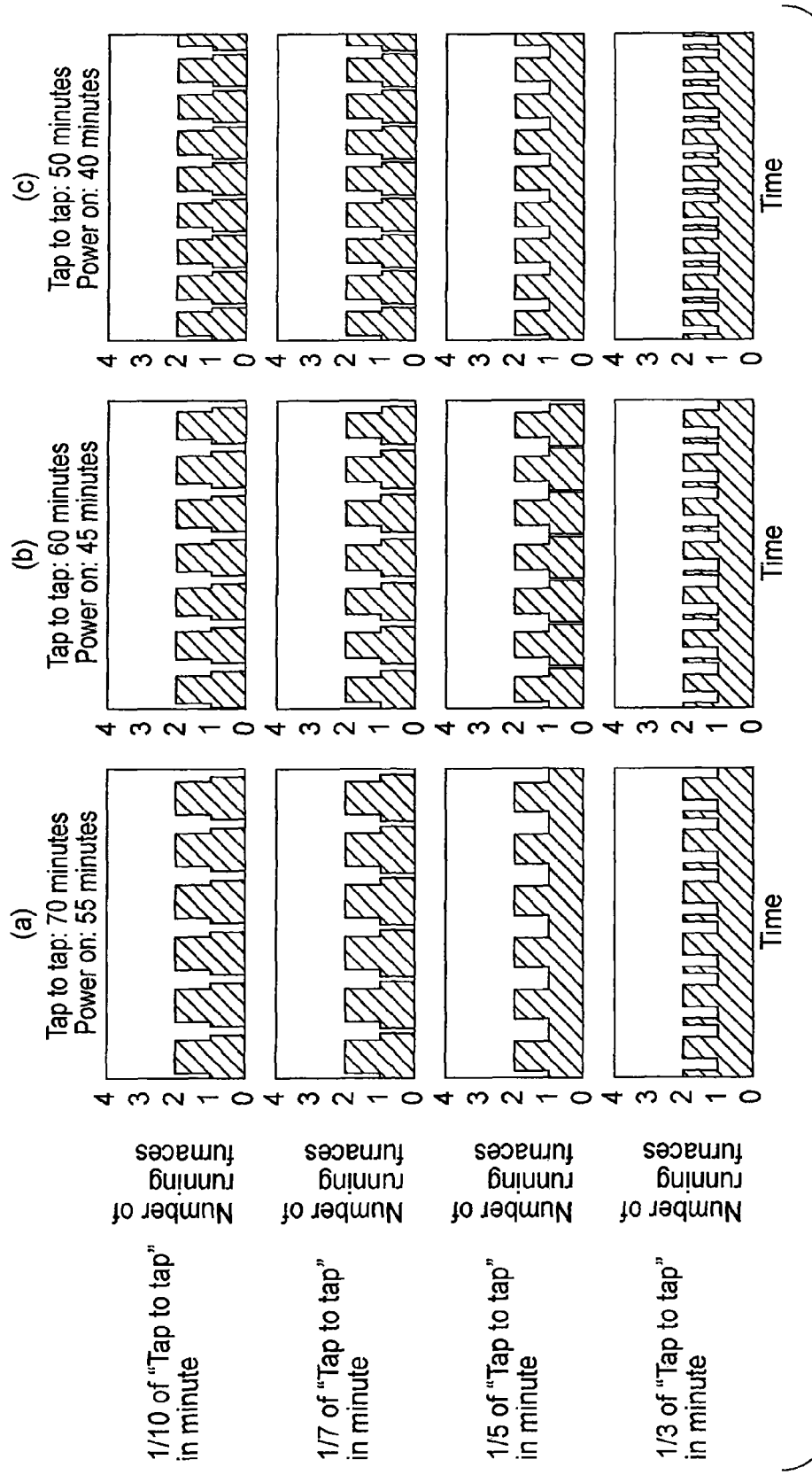
FIG. 14 This is a view showing results of simulations on changes over time in the number of running furnaces, on the premise that two steel making electric arc furnaces were used according to the second embodiment of the present invention, and further in cases where one heat was differently arranged such that (a) the steel making time (Tap to tap) was set at 70 minutes along with the electric power application time set at 55 minutes, (b) the steel making time (Tap to tap) was set at 60 minutes along with the electric power application time set at 45 minutes, and (c) the steel making time (Tap to tap) was set at 50 minutes along with the electric power application time set at 40 minutes; while the deviation time T was set at different values defined by $1/10$, $1/7$, $1/5$, and $1/3$ of "Tap to tap" expressed in minute.
Figure 15:
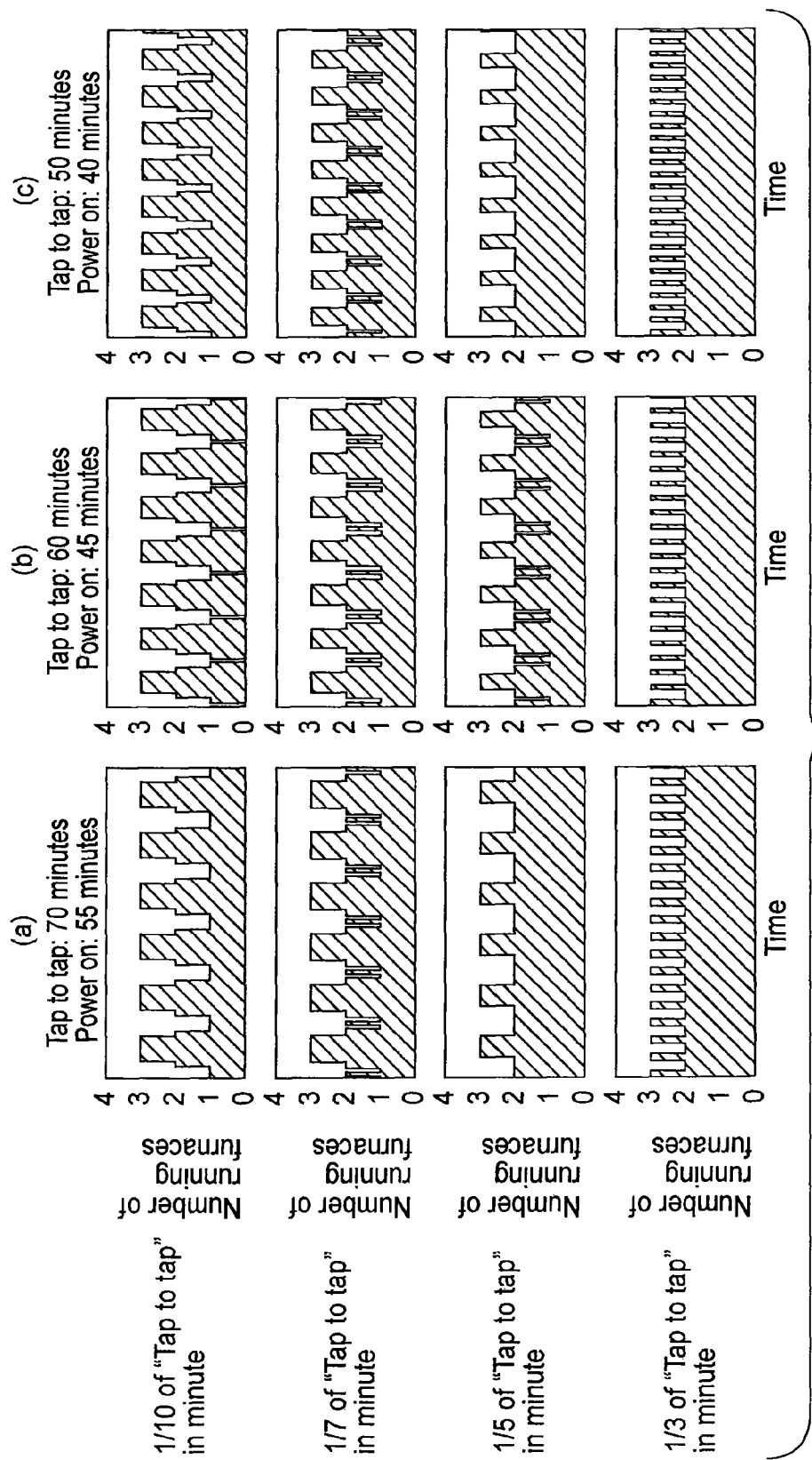
FIG. 15 This is a view showing results of simulations on changes over time in the number of running furnaces, on the premise that three steel making electric arc furnaces were used according to the second embodiment of the present invention, and further in cases where one heat was differently arranged such that (a) the steel making time (Tap to tap) was set at 70 minutes along with the electric power application time set at 55 minutes, (b) the steel making time (Tap to tap) was set at 60 minutes along with the electric power application time set at 45 minutes, and (c) the steel making time (Tap to tap) was set at 50 minutes along with the electric power application time set at 40 minutes; while the deviation time T was set at different values defined by $1/10$, $1/7$, $1/5$, and $1/3$ of "Tap to tap" expressed in minute.

FIG. 13 is a view showing results of simulations on changes over time in the number of running furnaces in cases where one heat was differently arranged such that (a) the steel making time (Tap to tap) was set at 70 minutes along with the electric power application time set at 55 minutes, (b) the steel making time (Tap to tap) was set at 60 minutes along with the electric power application time set at 45 minutes, and (c) the steel making time (Tap to tap) was set at 50 minutes along with the electric power application time set at 40 minutes; while the deviation time T was set at different values defined by 1/10, 1/7, 1/5, and 1/3 of "Tap to tap" expressed in minute (7 minutes in the case of (a)). It was confirmed that the cases with the deviation time T set at 1/5 of "Tap to tap" in minute made it possible to minimize the changes in the number of running furnaces and to maximize the rate in the number of running furnaces, i.e., to maximize the value obtained by temporally integrating the changes over time in the number of running furnaces (the area of the shaded part shown in FIG. 13). In this way, the deviation time T can be optimized within a range in which the formula (6) mentioned above is satisfied, to obtain the optimum running operation pattern, even if the number of running furnaces, the steel making time (Tap to tap), and/or the electric power application time are changed. Further, simulations were made under the same conditions as described above on the premise that two steel making electric arc furnaces were used and that three steel making electric arc furnaces were used, and the running operation patterns shown in FIGS. 14 and 15 were thereby formed, respectively. Also in these simulations, it was confirmed that the cases with the deviation time T set at 1/5 of "Tap to tap" in minute made it possible to obtain the optimum running operation pattern.

In this embodiment as well as the first embodiment, when the exhaust gas, which has been treated with the waste heat recovery, is used as a heat source for generating the superheated steam, the exhaust gas needs to have a heat quantity necessary for generating the superheated steam with a predetermined superheat degree. In light of this, it is necessary to prevent the temperature of the exhaust gas supplied into the steam super heater 43 from being lowered, as far as possible.

Accordingly, also in this embodiment, during a period (high temperature period) in which the steel making electric arc furnace 1 discharges exhaust gas having a high temperature, the damper 31 is set open and the damper 32 is set closed to supply the exhaust gas into the steam super heater 43, as shown in FIG. 3A. On the other hand, during a period (low temperature period) in which the steel making electric arc furnace 1 discharges exhaust gas having a low temperature, because, e.g., the furnace 1 stops the running operation, the damper 31 is set closed and the damper 32 is set open to lead the exhaust gas from the steel making electric arc furnace 1 into the ventilation duct 12, as shown in FIG. 3B, so as not to supply the exhaust gas from the steel making electric arc furnace 1 into the steam super heater 43. Consequently, it is possible to prevent the temperature of the exhaust gas for generating the superheated steam from being lowered, and thereby to stably generate the superheated steam with a predetermined superheat degree.

As described above, according to the second embodiment, there is provided a waste heat recovery structure used for a plurality of steel making electric arc furnaces, in which saturated steam parts generated by the waste heat boilers respectively disposed in the steel making electric arc furnaces are caused to be confluent with each other, and the confluent saturated steam is turned into superheated steam. The steel making electric arc furnaces are caused to sequentially perform their running operations by staggering them with a predetermined time so as to minimize the changes over time in the number of running furnaces of the steel making electric arc furnaces and thereby to maximize the values obtained by temporally integrating the changes in the number of running furnaces of the electric arc furnaces. Consequently, it is possible to uniformize the amount of superheated steam thus generated.

The present invention is not limited to the embodiments described above, and it may be modified in various manners. For example, in the embodiments described above, the four steel making electric arc furnaces are used, but the number of steel making electric arc furnaces may be set at any value as long as it is 2 or more. Further, in the embodiments described above, the saturated steam is used for generating electric power, but this is not limiting. Further, in the embodiments described above, the exhaust gas is burned by the combustion chamber to recover the sensible heat and combustion heat of the exhaust gas as waste heat. However, the combustion chamber is not necessary required, and the exhaust gas may be burned in a waste heat boiler without using the combustion chamber. Further, in the case of melting only steel scrap generated in iron mills or the like, this generates only a small amount of carbon monoxide without generating white smoke or evil smell. Accordingly, it is possible to perform heat recovery from exhaust gas having a higher temperature without forcibly taking in combustion air. In this case, the waste heat recovered from the exhaust gas is essentially only the sensible heat.

Further, the present invention may be implemented by suitably combining the matters described in the first embodiment with the matters described in the second embodiment.

REFERENCE SIGNS LIST

1=steel making electric arc furnace,
2=exhaust gas duct,
3=combustion chamber,
4=water-cooled duct,
5=duct,
6=waste heat boiler,
7=heat transfer tube,
8=air feed port,
10a, 10b, 10c, 10d=electric arc furnace unit,
11=ventilation hood,
12=ventilation duct,
13=steam drum,
17=saturated steam transfer piping line,
18=connection piping line,
21=furnace body,
23=arc electrode,
31, 32=damper,
41=exhaust gas collective duct,
42=downstream exhaust gas duct,
43=steam super heater,
51=ventilation collective duct,
52=exhaust gas dust trapping duct,
54=dust collector,
61=steam collective piping line,
62=steam accumulator,
63=power generation turbine,
70=monitoring, operating, and controlling section,
75=thermal storage body,
81, 83=thermometer,
82=controller,
91=saturated steam flow rate control valve,
92=heating steam thermometer,
93=heating steam flow rate meter,
94=controller,
95=exhaust gas flow rate meter,
96=exhaust gas thermometer,
97=saturated steam flow rate meter,
98=controller, and
100=steel making electric arc furnace facility.

The invention claimed is:

1. A waste heat recovery structure for a plurality of steel making electric arc furnaces, which recovers waste heat as saturated steam from exhaust gas discharged from the steel making electric arc furnaces and turns the saturated steam into superheated steam by subsequent heating, the structure comprising:
a first exhaust gas flow path provided to each of the steel making electric arc furnaces to discharge exhaust gas thereinto;
a waste heat boiler disposed on the first exhaust gas flow path and configured to recover waste heat as saturated steam from exhaust gas;
a steam accumulator configured to store steam formed by confluence of saturated steam parts, each generated by the waste heat boiler;
a steam super heater configured to turn steam, which has been stored in the steam accumulator, into superheated steam by heating;
a second exhaust gas flow path configured to lead exhaust gas, which has been treated with waste heat recovery in the waste heat boiler, to the steam super heater to use the exhaust gas for superheating saturated steam and to then discharge the exhaust gas;
a third exhaust gas flow path configured to discharge exhaust gas, which has been treated with waste heat recovery in the waste heat boiler, not through the steam super heater; and
a switching device configured to switch flow paths for exhaust gas, which has been treated with waste heat recovery, between the second exhaust gas flow path and the third exhaust gas flow path.

2. The waste heat recovery structure for steel making electric arc furnaces according to claim 1, wherein the waste heat recovered from exhaust gas is sensible heat of exhaust gas or sensible heat and combustion heat of exhaust gas.

3. The waste heat recovery structure for steel making electric arc furnaces according to claim 1, wherein the first exhaust gas flow path includes an exhaust gas duct and a combustion chamber configured to burn exhaust gas, and the waste heat boiler is configured to include at least one of the exhaust gas duct and the combustion chamber.

4. The waste heat recovery structure for steel making electric arc furnaces according to claim 1, wherein the waste heat boiler is disposed in a region in which a temperature of exhaust gas at an outlet port of the waste heat boiler is 600° C. or more.

5. The waste heat recovery structure for steel making electric arc furnaces according to claim 1, wherein the structure further comprises at least one of a gas thermometer disposed at an outlet port of the waste heat boiler and an inlet port of the steam super heater, and the switching device is operated to cause exhaust gas to flow into the second exhaust gas flow path when a temperature of exhaust gas at the outlet port of the waste heat boiler or a temperature of exhaust gas at the inlet port of the steam super heater is not lower than a predetermined temperature, and to cause exhaust gas to flow into the third exhaust gas flow path when the temperature of exhaust gas at the outlet port of the waste heat boiler or the temperature of exhaust gas at the inlet port of the steam super heater is lower than the predetermined temperature.

6. The waste heat recovery structure for steel making electric arc furnaces according to claim 1, wherein the third exhaust gas flow path comprises: a ventilation duct configured to ventilate at least one of a space around each of the steel making electric arc furnaces and a space inside a steel making factory where the steel making electric arc furnaces are disposed, a connection piping line connecting the second flow path to the ventilation duct, and a ventilation collective duct to which ducts, each being the ventilation duct, are collectively connected.

7. The waste heat recovery structure for steel making electric arc furnaces according to claim 6, wherein the structure further comprises: a dust collector configured to trap dust in exhaust gas flowing from the second exhaust gas flow path, and a cooler configured to cool exhaust gas to be sent to the dust collector.

8. The waste heat recovery structure for steel making electric arc furnaces according to claim 6, wherein the structure further comprises a dust collector configured to trap dust in exhaust gas flowing from the second exhaust gas flow path, and wherein exhaust gas flowing from the second exhaust gas flow path is mixed with cold gas flowing from the ventilation collective duct and is then led to the dust collector.

9. The waste heat recovery structure for steel making electric arc furnaces according to claim 8, wherein the second exhaust gas flow path comprises: an exhaust gas duct downstream from the waste heat boiler for each, an exhaust gas collective duct to which ducts, each being the exhaust gas duct, are collectively connected, and a downstream exhaust gas duct extending from the exhaust gas collective duct and connected to the steam super heater, such that the downstream exhaust gas duct is connected to the ventilation collective duct, the ventilation collective duct is connected to an exhaust gas dust trapping duct equipped with the dust collector, and exhaust gas flowing from the downstream exhaust gas duct is mixed with cold gas flowing from the ventilation collective duct and is then led to the dust collector through the exhaust gas dust trapping duct.

10. The waste heat recovery structure for steel making electric arc furnaces according to claim 8, wherein the structure further comprises a cooler configured to cool exhaust gas to be sent to the dust collector.

11. The waste heat recovery structure for steel making electric arc furnaces according to claim 1, wherein the structure further comprises a thermal storage body disposed on the second exhaust gas flow path at a position upstream from the steam super heater.

12. The waste heat recovery structure for steel making electric arc furnaces according to claim 1, wherein the structure further comprises: a saturated steam flow rate control valve configured to control a flow rate of saturated steam flowing into the steam super heater, a superheated steam thermometer configured to detect a temperature of superheated steam discharged from the steam super heater, and a controller configured to control the saturated steam flow rate control valve to control a superheated steam amount with reference to the temperature of superheated steam.

13. The waste heat recovery structure for steel making electric arc furnaces according to claim 1, wherein the structure further comprises: an exhaust gas flow rate meter configured to detect a flow rate of exhaust gas flowing into the steam super heater, an exhaust gas thermometer configured to detect a temperature of exhaust gas flowing into the steam super heater, a saturated steam flow rate meter configured to detect a flow rate of saturated steam flowing into the steam super heater, a flow rate regulating device configured to regulate the flow rate of exhaust gas, and a controller configured to control the flow rate regulating device to control the flow rate of exhaust gas with reference to the temperature of exhaust gas and the flow rate of saturated steam.

14. A steel making electric arc furnace facility comprising a plurality of steel making electric arc furnaces, and a waste heat recovery structure configured to recover waste heat as saturated steam from exhaust gas discharged from the steel making electric arc furnaces and to turn the saturated steam into superheated steam by subsequent heating,
the waste heat recovery structure comprising:
a first exhaust gas flow path provided to each of the steel making electric arc furnaces to discharge exhaust gas thereinto;
a waste heat boiler disposed on the first exhaust gas flow path and configured to recover waste heat as saturated steam from exhaust gas;
a steam accumulator configured to store steam formed by confluence of saturated steam parts, each generated by the waste heat boiler;
a steam super heater configured to turn steam, which has been stored in the steam accumulator, into superheated steam by heating;
a second exhaust gas flow path configured to lead exhaust gas, which has been treated with waste heat recovery in the waste heat boiler, to the steam super heater to use the exhaust gas for superheating saturated steam and to then discharge the exhaust gas;
a third exhaust gas flow path configured to discharge exhaust gas, which has been treated with waste heat recovery in the waste heat boiler, not through the steam super heater; and
a switching device configured to switch flow paths for exhaust gas, which has been treated with waste heat recovery, between the second exhaust gas flow path and the third exhaust gas flow path.

15. A waste heat recovery structure for a plurality of steel making electric arc furnaces, which recovers waste heat as saturated steam from exhaust gas discharged from the steel making electric arc furnaces and turns the saturated steam into superheated steam by subsequent heating, the structure comprising:
a first exhaust gas flow path provided to each of the steel making electric arc furnaces to discharge exhaust gas thereinto;
a waste heat boiler disposed on the first exhaust gas flow path and configured to recover waste heat as saturated steam from exhaust gas;
a steam accumulator configured to store steam formed by confluence of saturated steam parts, each generated by the waste heat boiler;
a steam super heater configured to turn steam, which has been stored in the steam accumulator, into superheated steam by heating;
a second exhaust gas flow path configured to lead exhaust gas, which has been treated with waste heat recovery in the waste heat boiler, to the steam super heater to use the exhaust gas for superheating saturated steam; and
an operation section configured to operate the steel making electric arc furnaces to sequentially perform respective running operations by staggering the running operations with a predetermined deviation time,
wherein the operation section sets the deviation time to minimize changes over time in the number of running furnaces of the steel making electric arc furnaces.

16. The waste heat recovery structure for steel making electric arc furnaces according to claim 15, wherein the operation section sets the deviation time within a range in which "$(N-(n-1)\times T)-(A\times(m-(n-1)))<B$" is satisfied for an "n"-th electric arc furnace, where "N" is an arbitrary time after a first one of the steel making electric arc furnaces starts operating, "A" is one steel making time, "B" is an electric power application time, "m" is the number of running operations, and "T" is the deviation time.

17. The waste heat recovery structure for steel making electric arc furnaces according to claim 15, wherein the deviation time is ⅕ of one steel making time expressed in minute.

18. The waste heat recovery structure for steel making electric arc furnaces according to claim 15, wherein the structure further includes a third exhaust gas flow path configured to discharge exhaust gas, which has been treated with waste heat recovery in the waste heat boiler, not through the steam super heater; and a switching device configured to switch flow paths for exhaust gas, which has been treated with waste heat recovery, between the second exhaust gas flow path and the third exhaust gas flow path.

19. The waste heat recovery structure for steel making electric arc furnaces according to claim 15, wherein the waste heat boiler is disposed in a region in which a temperature of exhaust gas flowing through the first exhaust gas flow path is 600° C. or more.

20. A waste heat recovery method for a plurality of steel making electric arc furnaces, by use of a waste heat recovery structure that includes a first exhaust gas flow path provided to each of the steel making electric arc furnaces to discharge exhaust gas thereinto; a waste heat boiler disposed on the first exhaust gas flow path and configured to recover waste heat as saturated steam from exhaust gas; a steam accumulator configured to store steam formed by confluence of saturated steam parts, each generated by the waste heat boiler; a steam super heater configured to turn steam, which has been stored in the steam accumulator, into superheated steam by heating; and a second exhaust gas flow path configured to lead exhaust gas, which has been treated with waste heat recovery in the waste heat boiler, to the steam super heater to use the exhaust gas for superheating saturated steam, the method comprising: operating the steel making electric arc furnaces to sequentially perform respective running operations by staggering the running operations with a predetermined deviation time, wherein the deviation time is set to minimize changes over time in the number of running furnaces of the steel making electric arc furnaces.

21. The waste heat recovery method for steel making electric arc furnaces according to claim 20, wherein the deviation time is set within a range in which "$(N-(n-1)\times T)-(A\times(m-(n-1)))<B$" is satisfied for an "n"-th electric arc furnace, where "N" is an arbitrary time after a first one of the steel making electric arc furnaces starts operating, "A" is one steel making time, "B" is an electric power application time, "m" is the number of running operations, and "T" is the deviation time.

22. The waste heat recovery method for steel making electric arc furnaces according to claim 20, wherein the deviation time is $1/5$ of one steel making time expressed in minute.

23. The waste heat recovery method for steel making electric arc furnaces according to claim 20, wherein the method comprises: leading exhaust gas, which has been treated with waste heat recovery, through the second exhaust gas flow path to the steam super heater and using heat of this exhaust gas to turn saturated steam into superheated steam; and causing exhaust gas discharged from each of the steel making electric arc furnaces to flow into a third exhaust gas flow path not going through the steam super heater when a temperature of this exhaust gas is low.

24. A steel making electric arc furnace facility comprising a plurality of steel making electric arc furnaces, and a waste heat recovery structure configured to recover waste heat as saturated steam from exhaust gas discharged from the steel making electric arc furnaces and to turn the saturated steam into superheated steam by subsequent heating, the waste heat recovery structure comprising:
a first exhaust gas flow path provided to each of the steel making electric arc furnaces to discharge exhaust gas thereinto;
a waste heat boiler disposed on the first exhaust gas flow path and configured to recover waste heat as saturated steam from exhaust gas;
a steam accumulator configured to store steam formed by confluence of saturated steam parts, each generated by the waste heat boiler;
a steam super heater configured to turn steam, which has been stored in the steam accumulator, into superheated steam by heating;
a second exhaust gas flow path configured to lead exhaust gas, which has been treated with waste heat recovery in the waste heat boiler, to the steam super heater to use the exhaust gas for superheating saturated steam; and
an operation section configured to operate the steel making electric arc furnaces to sequentially perform respective running operations by staggering the running operations with a predetermined deviation time,
wherein the operation section sets the deviation time to minimize changes over time in the number of running furnaces of the steel making electric arc furnaces.

* * * * *